United States Patent
Urano et al.

(10) Patent No.: US 8,204,687 B2
(45) Date of Patent: Jun. 19, 2012

(54) DISPLAY ROUTE CREATION METHOD, DISPLAY ROUTE CREATION APPARATUS, AND DISPLAY ROUTE CREATION PROGRAM

(75) Inventors: Izumi Urano, Tokyo (JP); Satoshi Suzuno, Kanagawa (JP); Atsushi Asai, Kanagawa (JP)

(73) Assignee: Sony Corporation, Tokyo (JP)

( * ) Notice: Subject to any disclaimer, the term of this patent is extended or adjusted under 35 U.S.C. 154(b) by 819 days.

(21) Appl. No.: 12/255,600

(22) Filed: Oct. 21, 2008

(65) Prior Publication Data

US 2009/0105944 A1 Apr. 23, 2009

(30) Foreign Application Priority Data

Oct. 22, 2007 (JP) ............... P2007-274312
Oct. 22, 2007 (JP) ............... P2007-274313

(51) Int. Cl.
G01C 21/00 (2006.01)
(52) U.S. Cl. ........ 701/533; 701/411; 701/416; 701/456; 701/457
(58) Field of Classification Search ........ 701/411, 701/416, 456, 457, 533
See application file for complete search history.

(56) References Cited

U.S. PATENT DOCUMENTS

| | | | |
|---|---|---|---|
| 5,925,090 A * | 7/1999 | Poonsaengsathit | 701/440 |
| 7,395,153 B1 * | 7/2008 | Nesbitt et al. | 701/533 |
| 7,542,882 B2 * | 6/2009 | Agrawala et al. | 703/2 |
| 2005/0102097 A1 * | 5/2005 | Tanizaki et al. | 701/208 |
| 2006/0089795 A1 * | 4/2006 | Sumizawa et al. | 701/208 |

FOREIGN PATENT DOCUMENTS

| | | |
|---|---|---|
| JP | 5-52999 | 7/1993 |
| JP | 6-37999 | 5/1994 |
| JP | 7-105479 | 4/1995 |
| JP | 08-137391 | 5/1996 |
| JP | 10-198267 | 7/1998 |
| JP | 10-281787 | 10/1998 |
| JP | 11-237833 | 8/1999 |
| JP | 11-344352 | 12/1999 |
| JP | 2001-311625 | 11/2001 |
| JP | 2003-185454 | 7/2003 |
| JP | 2003-344093 | 12/2003 |
| JP | 2004-258352 | 9/2004 |
| JP | 2004-361828 | 12/2004 |
| JP | 2006-132954 | 5/2006 |
| JP | 2006-177871 | 7/2006 |
| JP | 2006-329932 | 12/2006 |

* cited by examiner

*Primary Examiner* — Jack W Keith
*Assistant Examiner* — Adam Tissot
(74) *Attorney, Agent, or Firm* — Finnegan, Henderson, Farabow, Garrett & Dunner, L.L.P.

(57) ABSTRACT

A display route creation method includes: a route determination step in which a route determination section determines a route based on a departure point and a destination set on a map; a directional sign information extraction step in which a read section reads out directional sign information existing on the route from a map information storage section; and a route creation step in which a merging section merges a display image portion indicating the road direction included in the directional sign information and the route to create a display route in which the route and display image portion are integrated with each other.

24 Claims, 23 Drawing Sheets

NODE POINT HAVING LARGE ANGLE CHANGE
 NODE POINT HAVING DIRECTIONAL SIGN INFORMATION

| CONCENTRATION "HIGH" | NUMBER OF DIRECTIONAL SIGN INFO IS EQUAL TO OR MORE THAN 30 |
|---|---|
| CONCENTRATION "MIDDLE" | NUMBER OF DIRECTIONAL SIGN INFO IS EQUAL TO OR MORE THAN 15 |
| CONCENTRATION "LOW" | NUMBER OF DIRECTIONAL SIGN INFO IS EQUAL TO OR LESS THAN 14 |

DISPLAY ROUTE CREATION METHOD, DISPLAY ROUTE CREATION APPARATUS, AND DISPLAY ROUTE CREATION PROGRAM

CROSS REFERENCES TO RELATED APPLICATIONS

The present invention contains subject matter related to Japanese Patent Application JP2007-274313 filed in the Japanese Patent Office on Oct. 22, 2007, and Japanese Patent Application JP2007-274312 filed in the Japanese Patent Office on Oct. 22, 2007, the entire contents of which being incorporated herein by reference.

BACKGROUND OF THE INVENTION

1. Field of the Invention

The present invention relates to a display route creation method, a display route creation apparatus, and a display route creation program, which are suitably applied to a case of creating an easy-to-read and easy-to-understand route map connecting a departure point and a destination in, e.g., a car navigation apparatus.

2. Description of the Related Art

There has been proposed an apparatus for delivering data on route guidance for pedestrians. The apparatus creates guidance data for guiding an underground route on the basis of guide signboard data of a route signboard installed in an underground mall and map data and further creates transmission data for displaying a character string of the guide signboard on a display screen on the basis of the created guidance data (refer to, e.g., Jpn. Pat. Appln. Laid-Open Publication No. 2003-344093).

The apparatus for delivering data on route guidance for pedestrians allows a pedestrian to recognize his or her current location properly and grasp a route up to his or her destination easily, even at a place where recognition of the current location is difficult, such as in an underground shopping mall.

SUMMARY OF THE INVENTION

The apparatus having the above configuration displays a character string of the guide signboard on a display screen in the same manner as an actual guide signboard displays a character string. However, the apparatus guides the route only using the character string, so that the user (pedestrian) needs to read the character string. Thus, the map that the apparatus provides is insufficient to allow the user to intuitively recognize a route to his or her destination.

The present invention has been made in view of the above points, and an object thereof is to propose a display route creation method, a display route creation apparatus, and a display route creation program capable of creating a more intuitive and more easily recognizable display route.

To solve the above problem, according to a first aspect of the present invention, a display route creation method includes the steps of: determining a route based on a departure point and a destination set on a map; reading out directional sign information existing on the route from a map information storage section; and merging a display image portion indicating the road direction included in the directional sign information and the route to create a display route in which the route and display image portion are integrated with each other.

With the above configuration, the display route in which the display image portion of the directional sign information and route from a departure point to destination are integrated with each other is used to guide a user while presenting, as a mark for the user to confirm during migration, to the user the display image portion of the directional sign information corresponding to the content of an actual directional sign.

To solve the above problem, according to a second aspect of the present invention, a display route creation method includes the steps of: determining a route based on a departure point and a destination set on a map; reading out directional sign information existing on the route from map information storage section; calculating the number of the directional sign information with respect to a plurality of line segments constituting the route; determining that the concentration of the directional sign information is determined to be low when recognizing the number of the directional sign information is less than a predetermined threshold value; and shortening the line segment at a predetermined proportion when determining, for the line segment, the concentration of the directional sign information is low to create a simplified route.

With the above configuration, even if a line segment having a small number of the directional sign information is shortened, the length to the intersection at which the next directional sign information exists does not become too short, so that it is possible to create a simplified route without causing a user to feel odd.

According to the present invention, a display route creation method determines a route based on a departure point and a destination set on a map, reads out directional sign information existing on the route from the map information storage section; and merges a display image portion indicating the road direction included in the directional sign information and the route to create a display route in which the route and display image portion are integrated with each other. With the above configuration, the display route in which the display image portion of the directional sign information and route from a departure point to destination are integrated with each other is used to guide a user while presenting, as a mark for the user to confirm during migration, to the user the display image portion of the directional sign information corresponding to the content of an actual directional sign. As a result, it is possible to realize a display route creation method, a display route creation apparatus, and a display route creation program capable of creating a more intuitive and more easily recognizable display route.

According to the present invention, even if a line segment having a small number of the directional sign information is shortened, the length to the intersection at which the next directional sign information exists does not become too short, so that it is possible to create a simplified route without causing a user to feel odd. As a result, it is possible to realize a display route creation method, a display route creation apparatus, and a display route creation program capable of creating a more intuitive and more easily recognizable display route.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Now, an embodiment of the present invention will be described in detail below with reference to the accompanying drawings.

(1) Configuration of Display Route Creation Apparatus

Figure 1:
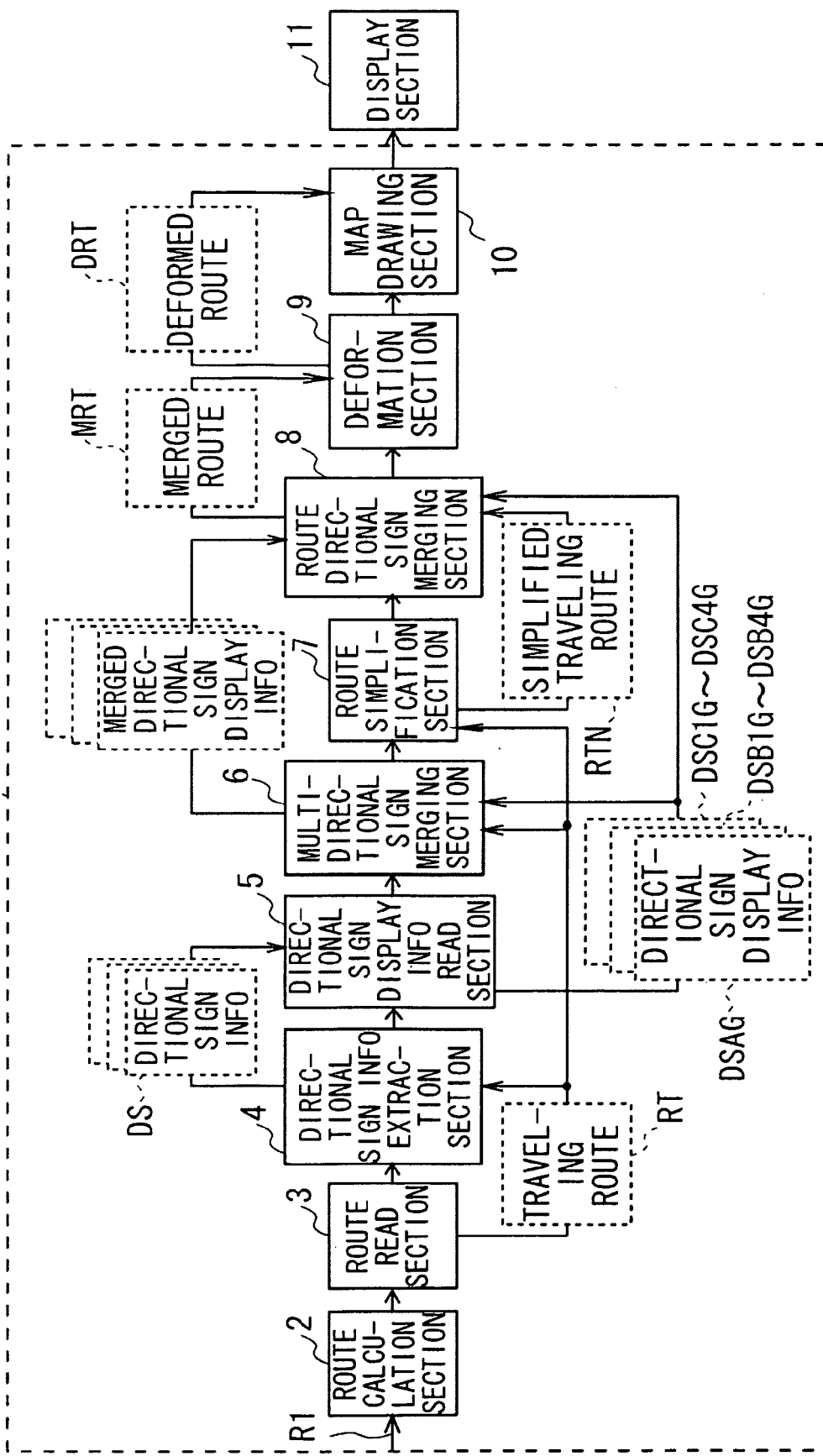
FIG. 1 is a schematic block diagram showing a circuit configuration of a display route creation apparatus according to an embodiment of the present invention.
Figure 2:
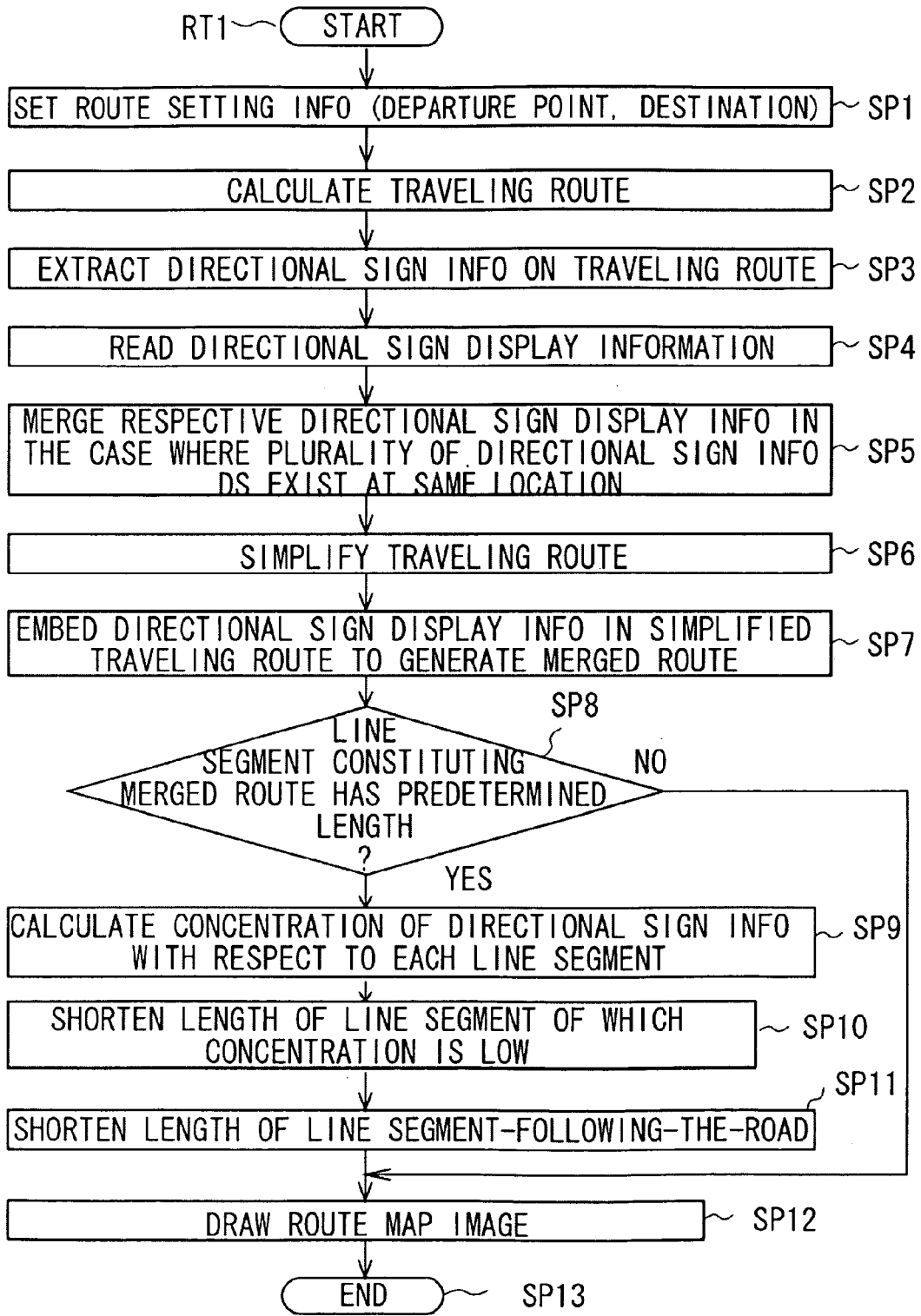
FIG. 2 is a flowchart showing a display route creation/drawing processing procedure.

In FIG. 1, reference numeral 1 denotes the entire configuration of a display route creation apparatus according to an embodiment of the present invention. FIG. 2 is a flowchart showing a display route creation/drawing processing procedure according to a display route creation method employed in the display route creation apparatus 1.

The display route creation apparatus 1 has a microcomputer configuration and constructs, in a software manner, a route calculation section 2, a route read section 3, a directional sign information extraction section 4, a directional sign display information read section 5, a multi-directional sign merging section 6, a route simplification section 7, a route directional sign merging section 8, a deformation section 9, and a map drawing section 10 according to a predetermined application program. With the above components, the display route creation apparatus 1 can execute a display route creation/drawing processing procedure.

As shown in FIG. 2, the display route creation apparatus 1 enters the display route creation/drawing processing procedure from routine RT1 (starting step) and advances to step SP1.

Figure 3:
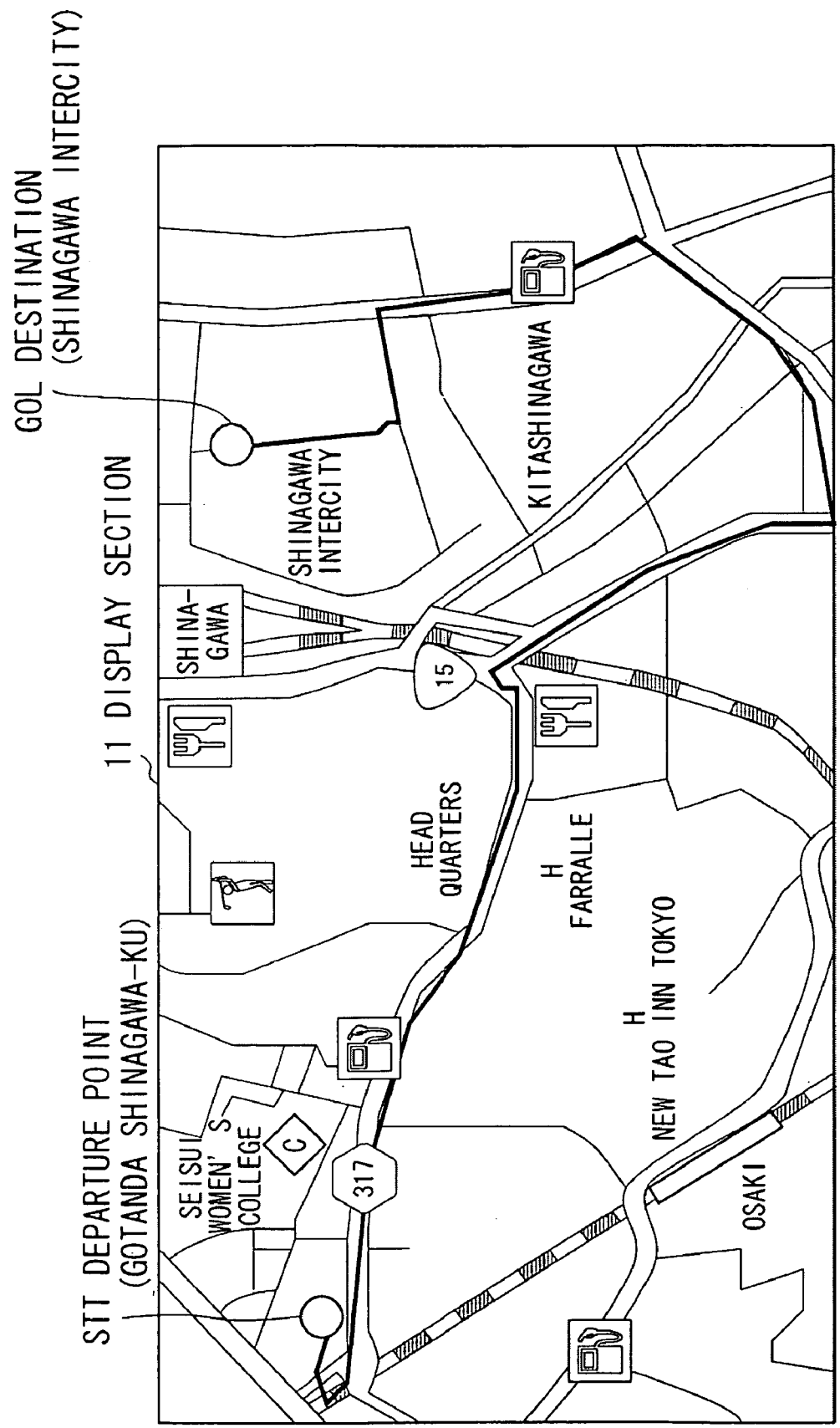
FIG. 3 is a schematic view showing an input example of route information (departure point, destination)

In step SP1, in the case where a departure point (Higashi-gotanda, Shinagawa-ku) STT and destination (Shinagawa Intercity) GOL are set through a user's operation with respect to a map displayed on a display section 11 (FIG. 1) which is, e.g., a liquid crystal display as shown in FIG. 3, the display route creation apparatus 1 loads route setting information R1 including the departure point STT and destination GOL in the route calculation section 2 and then advances to step SP2.

Figure 4:
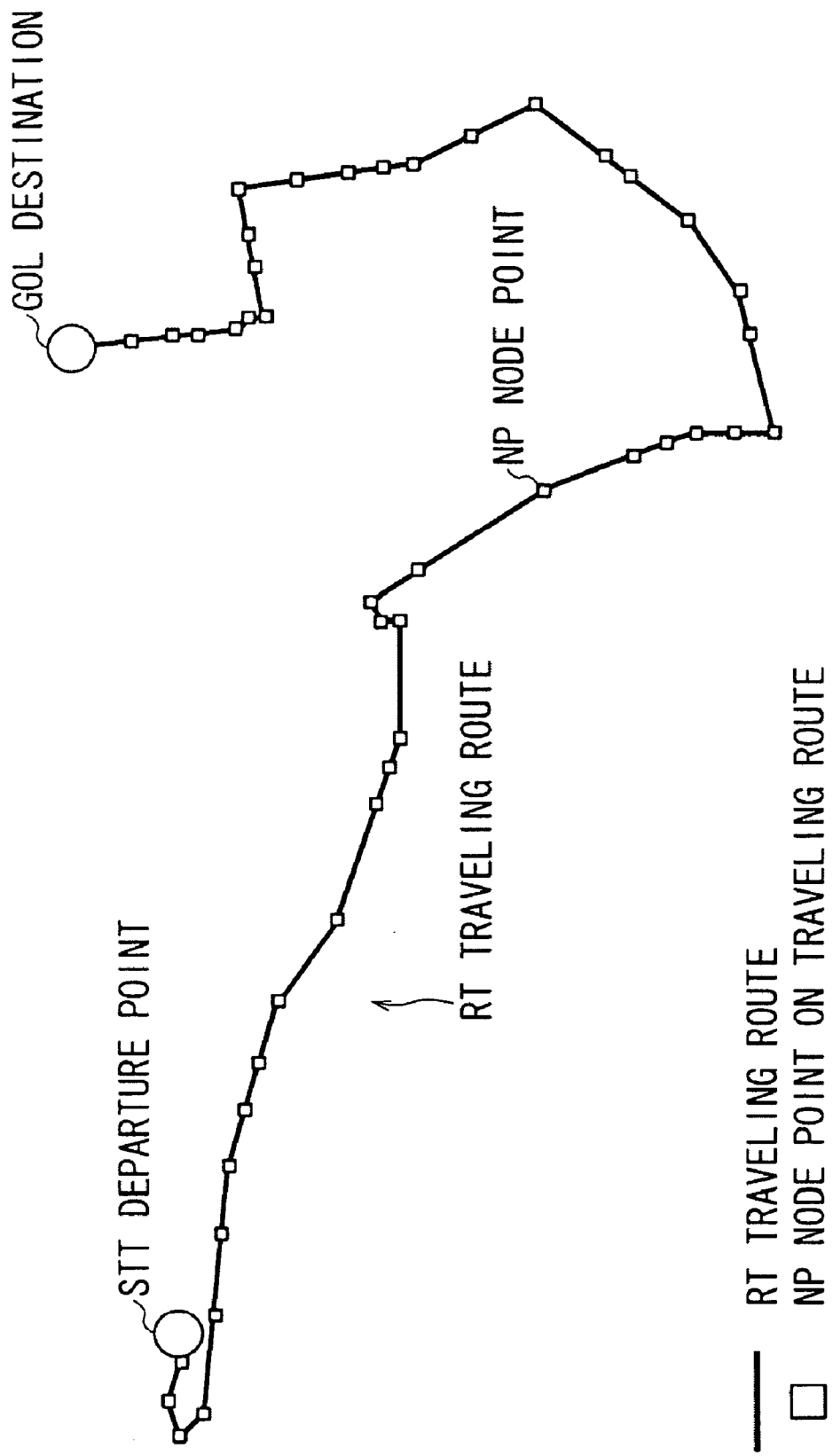
FIG. 4 is a schematic view showing a traveling route calculation result.

In step SP2, the display route creation apparatus 1 uses the route calculation section 2 to search a route from the departure point STT to destination GOL based on the route setting information R1 to thereby calculate a traveling route RT obtained by connecting a plurality of node points NP (see FIG. 4) and then advances to step SP3.

At this time, the display route creation apparatus 1 uses the route read section 3 to read the traveling route RT calculated by the rote calculation section 2 and supplies the read traveling route RT to the directional sign information extraction section 4, multi-directional sign merging section 6, and route simplification section 7.

Figure 5:
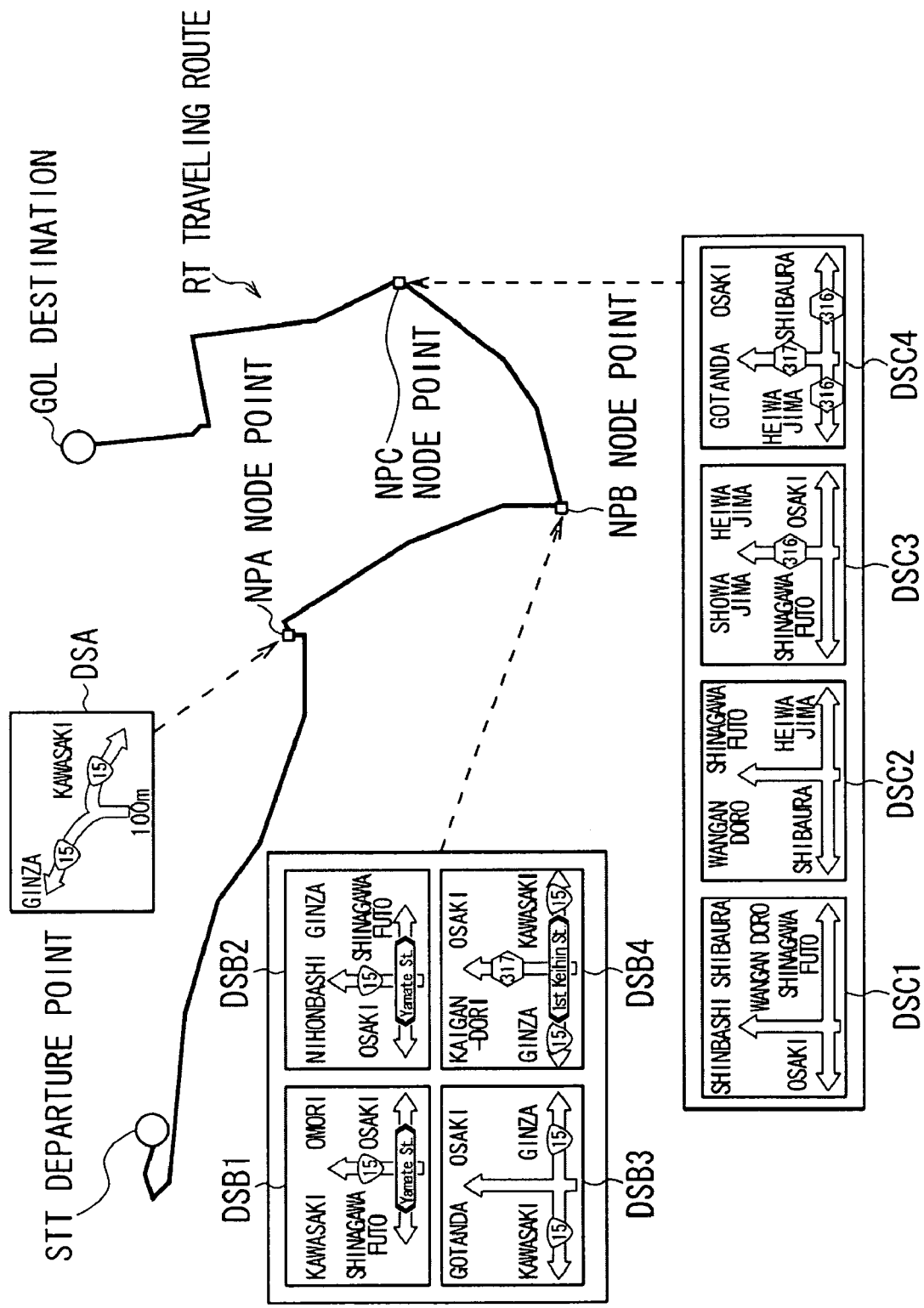
FIG. 5 is a schematic view to help explain extraction of directional sign information on a traveling route.

In step SP3, the display route creation apparatus 1 uses the directional sign information extraction section 4 to extract all directional sign information DS set in the traveling route RT from a map database (not shown) as shown in FIG. 5, transmits the extracted information to the directional sign display information read section 5, and then advances to step SP4.

The directional sign information DS is data including the same display images as those on the directional signs installed at intersections on main roads (including T-junctions, forks, etc.) or concrete content of the directional signs. That is, the display images of the actual directional signs that a user views when he or she drives a car along the traveling root RT are the same as those of the directional sign information DS.

Although the present embodiment assumes that the directional sign information DS are installed at intersections, the directional sign information DS may be installed at any place along the road.

Concretely, in such a case, the display route creation apparatus 1 acquires directional sign information DSA set at a node point NPA corresponding to an intersection on the traveling route RT to extract directional sign information DSB1 to DSB4 set at a node point NPB corresponding to the next intersection and directional sign information DSC1 to DSC4 set at a node point NPC corresponding to the next intersection.

The node point NPA is located at the intersection having a fork where only one directional sign information DSA exists, while the node point NPB and node point NPC are located at general intersections where directional sign information DSB1 to DSB4 and directional sign information DSC1 to DSC4 which are corresponding to viewpoints from four directions, respectively.

For the sake of simplification, in the traveling route RT shown in FIG. 5, only the node points NPA, NPB, and NPC where the directional sign information DS exist are shown and other node points NP are omitted.

In step SP4, the display route creation apparatus 1 uses the directional sign display information read section 5 to read, from the directional sign information DSA, DSB1 to DSB4, and DSC1 to DSC4 extracted in step SP3, respective display images as directional sign display information DSAG, DSB1G to DSB4G, and DSC1G to DSC4G and then advances to step SP5.

In step SP5, in the case where a plurality of directional sign information DS exist at the same location, that is, in the case where the directional sign information DSB1 to DSB4 exist at the node point NPB or case where the directional sign information DSC1 to DSC4 exist at the node point NPC, the display route creation apparatus 1 uses the multi-directional sign merging section 6 to merge the directional sign display information DSB1G to DSB4G and DSC1G to DSC4G for respective node points NPB and NPC, transmits the merge results to the route simplification section 7, and then advances to step SP6.

Figure 6:
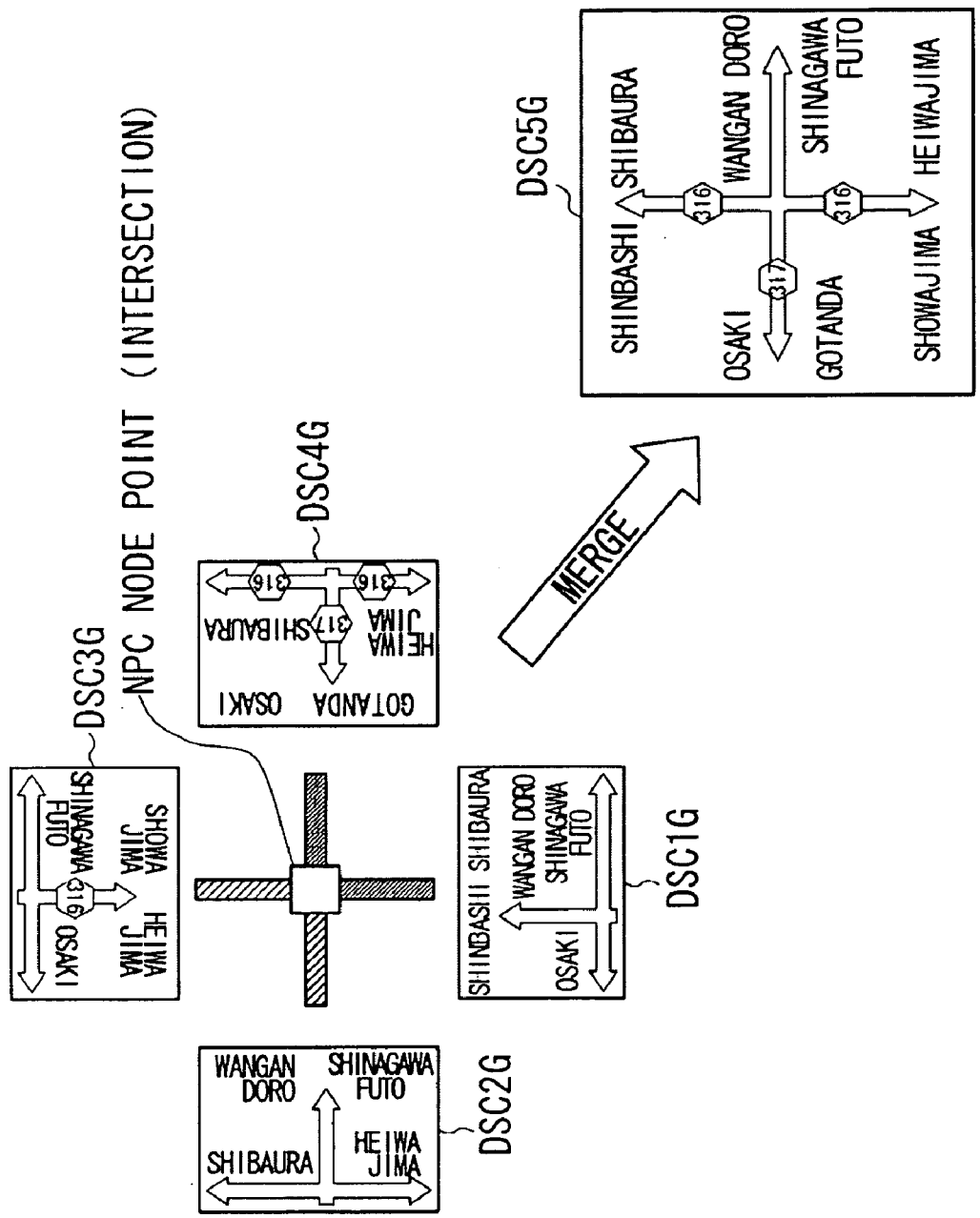
FIG. 6 is a schematic view to help explain merge of directional sign display information.

Concretely, since four directional sign information DSC1 to DSC4 exist at, e.g., node point NPC, the display route creation apparatus 1 uses the multi-directional sign merging section 6 to merge the directional sign display information DSC1G to DSC4G to thereby generate new directional sign display information DSCG5 representing four directions specific to the intersection at the node point NPC, as shown in FIG. 6.

Although not shown, since four directional sign information DSB1 to DSB4 exist at the node point NPB, the display route creation apparatus 1 can merge the directional sign display information DSB1G to DSB4G to generate new directional sign display information DSB5G (not shown) representing four directions specific to the intersection at the node point NPB.

In step SP6, the display route creation apparatus 1 uses the route simplification section 7 to thin out omittable node points NP from the traveling route RT calculated in step SP2 which has been obtained by connecting a large number of node points NP in order to make the map more visible to thereby generate a simplified traveling route RTN in which the display mode of the traveling route RT is simplified, transmits the generated simplified traveling route RTN to the route directional sign merging section 8, and then advances to step SP7.

Figure 7A:
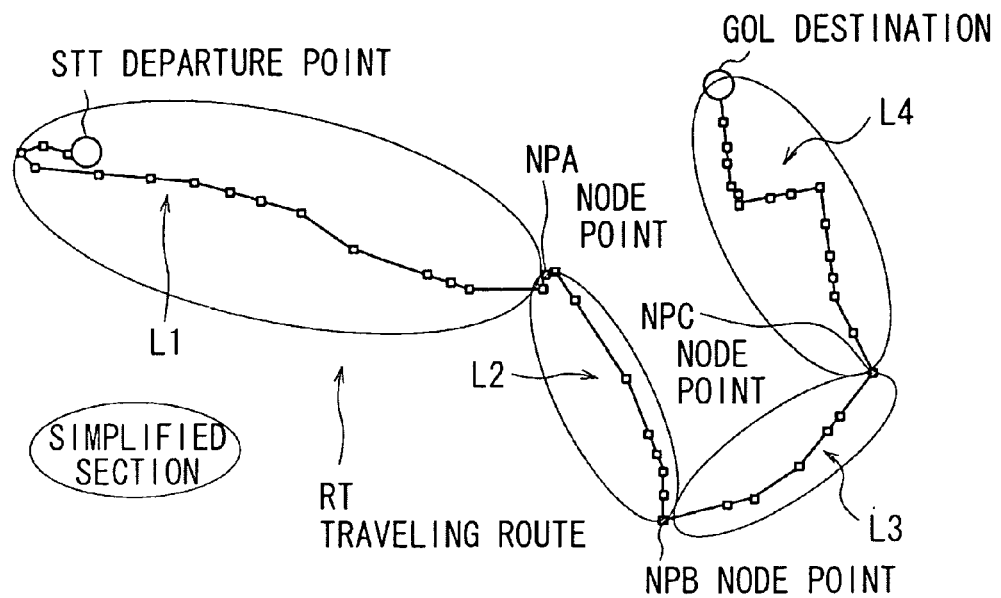
FIGS. 7A and 7B are schematic views to help explain simplification of a traveling route.

Concretely, as shown in FIG. 7A, the display route creation apparatus 1 uses the route simplification section 7 to divide the traveling route RT into four line segments: line segment L1 corresponding to a section from the departure point STT to node point NPA where the directional sign information DSA exists; line segment L2 corresponding to a section from the node point NPA to node point NPB where the next directional sign information DSB1 to DSB4 exist; line segment L3 corresponding to a section from the node point NPB to node point NPC where the next directional sign information DSC1 to DSC4 exist; and line segment L4 corresponding to a section from the node point NPC to destination GOL.

Figure 7B:
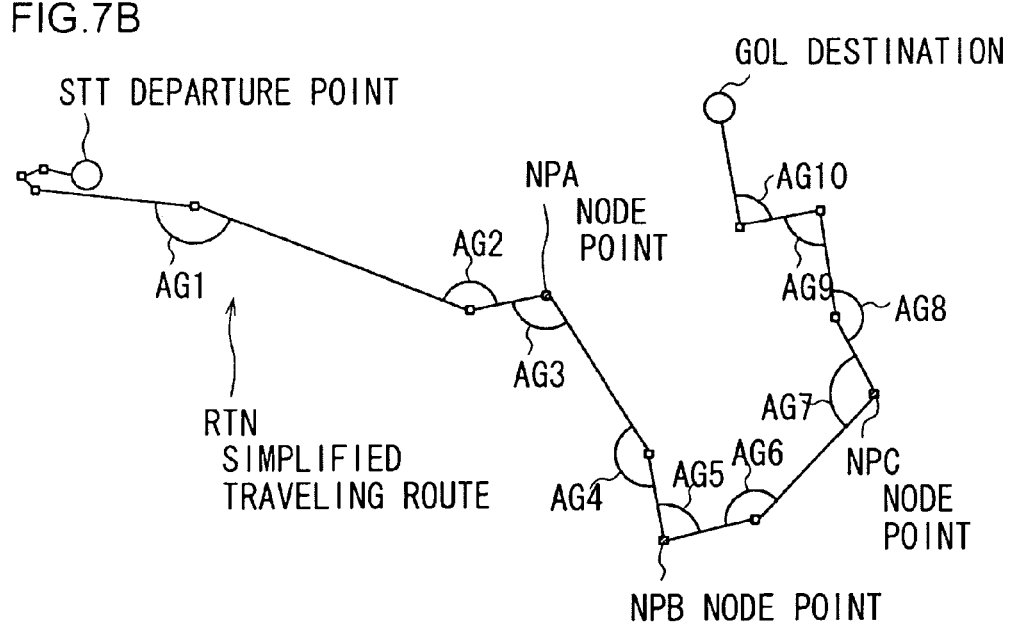
Figure 7B:
Figure 7B:

At this time, as shown in FIG. 7B, the route simplification section 7 does not thin out the node points NPA to NPC corresponding to the intersections where the directional sign information DS are set but leaves them on the line segments L1 to L4.

The reason will be explained by taking the node point NPC where the directional sign information DS is set as an example. That is, when the directional sign display information DSC5G generated in step SP5 is embedded in the node point NPC of the simplified traveling route RTN and displayed, the node point NPC is needed for a user to check the directional sign display information DSC5G against the actual directional sign in order to visually confirm his or her traveling direction.

At the same time, when the angle formed by two line segments connecting the node points NP is equal to or less than, e.g., 160° as the angles AG1 to AG10 in FIG. 7A, the route simplification section 7 determines that the degree of curve of the traveling route is large and leaves all the three node points NP forming each of the angles AG1 to AG10 and thins out all the node points NP (not shown) that do not form each of the angles AG1 to AG10, to thereby generate the simplified traveling route RTN.

Thus, even in the case where the traveling route RT is simplified, it is possible to allow the visual image of the degree of curve of the actual road to coincide with the visual image of the degree of curve of the simplified traveling route RTN.

In step SP7, the display route creation apparatus 1 uses the route directional sign merging section 8 to embed the directional sign display information DSAG corresponding to the node point NPA, directional sign display information DSB5G (not shown) after merging corresponding to the node point NPB, and directional sign display information DSC5G corresponding to the node point NBC in predetermined positions of the simplified traveling route RTN to thereby generate a merged route MRT, transmits the merged route MRT to the deformation section 9, and then advances to step SP8.

Figure 8:
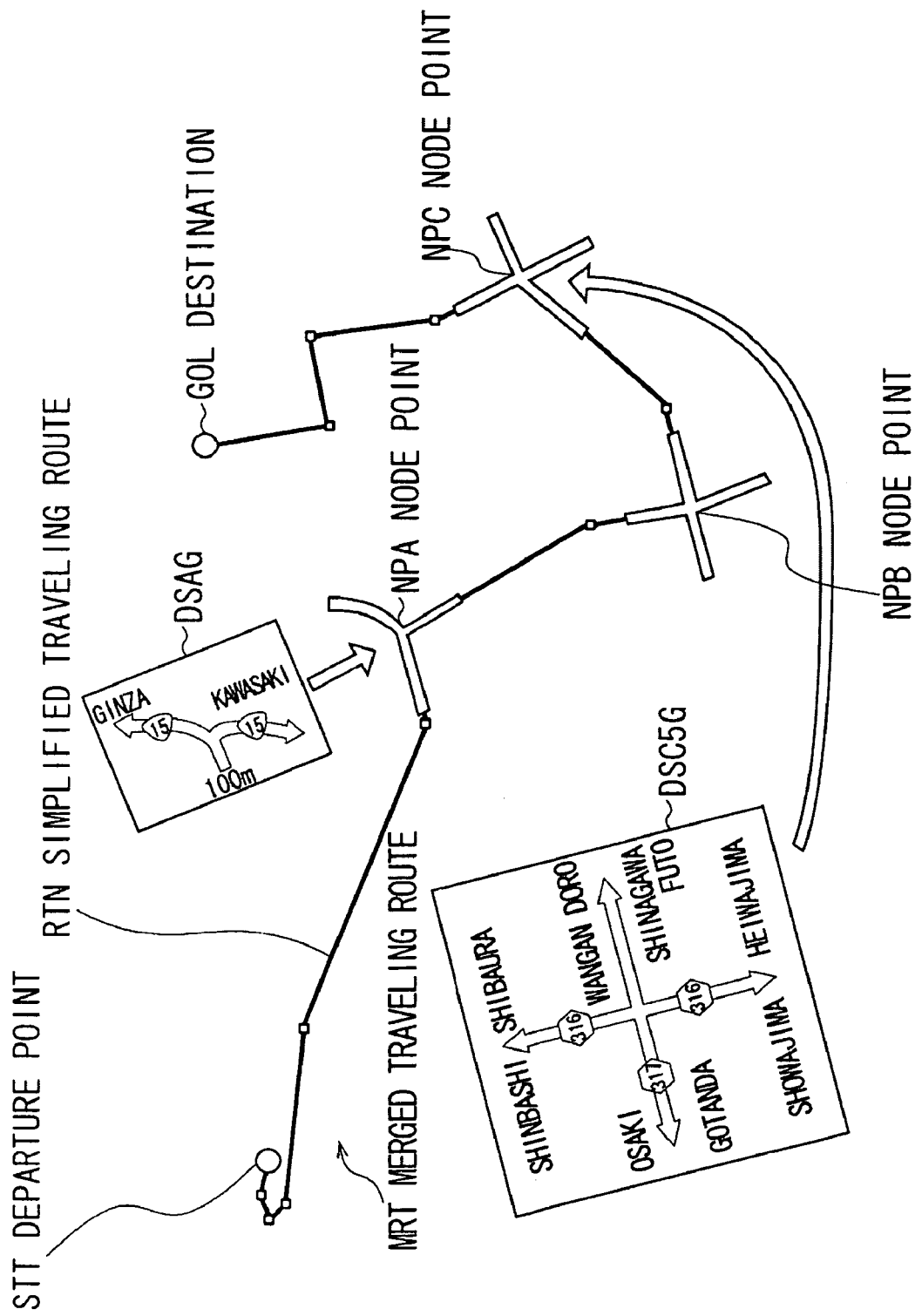
FIG. 8 is a schematic view to help explain embedding of the directional sign display information in a simplified traveling route.

In this case, as shown in FIG. 8, the route directional sign merging section 8 of the display route creation apparatus 1 embeds the directional sign display information DSAG in the node point NPA on the simplified traveling route RTN in an overlapping manner such that the vector display portion (represented by some arrows) of the directional sign display information DSAG corresponding to the node point NPA follows the simplified traveling route RTN and that the directions of the arrows coincide with those of respective separate paths.

Further, the route directional sign merging section 8 of the display route creation apparatus 1 embeds the directional sign display information DSB5G (not shown) in the node point NPB on the simplified traveling route RTN in an overlapping manner such that the vector display portion (represented by some arrows) of the directional sign display information DSB5G corresponding to the node point NPB follows the simplified traveling route RTN and that the directions of the arrows coincide with those of respective separate paths.

Further, the route directional sign merging section 8 of the display route creation apparatus 1 embeds the directional sign display information DSC5G in the node point NPC on the simplified traveling route RTN in an overlapping manner such that the vector display portion (represented by some arrows) of the directional sign display information DSC5G corresponding to the node point NPC follows the simplified traveling route RTN and that the directions of the arrows coincide with those of respective separate paths.

In this manner, the display route creation apparatus 1 uses the route directional sign merging section 8 to embed the directional sign display information DSAG, directional sign display information DSB5G, and directional sign display information DSC5G in the node points NPA, NPB, and NPC on the simplified traveling route RTN in an overlapping manner such that each of the vector display portions (represented by some arrows) of the above directional sign display information follow the simplified traveling route RTN and that the directions of the arrows of each of the vector display portions coincide with those of respective separate paths, to thereby generate the merged route MRT.

Figure 9:
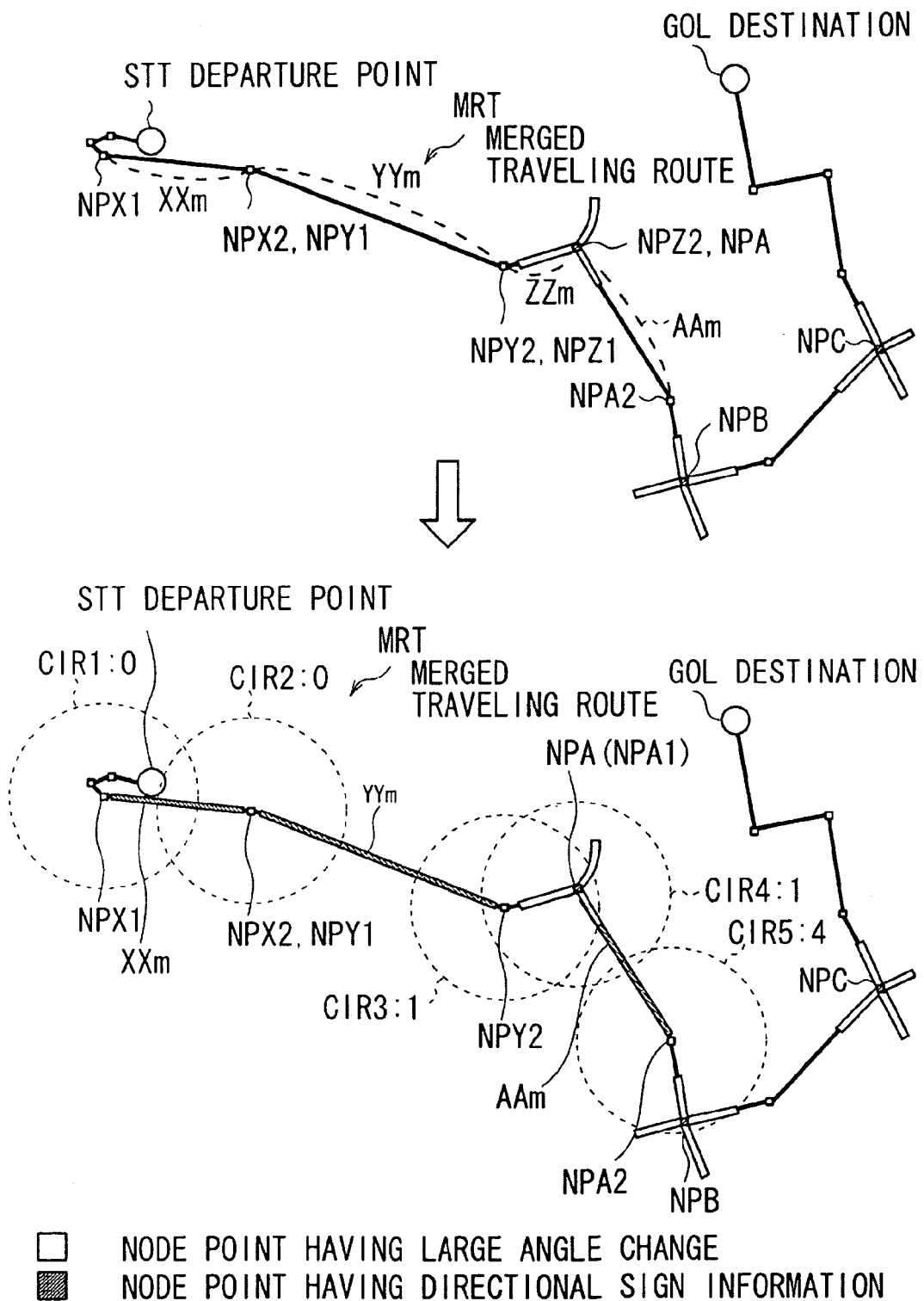
FIG. 9 is a schematic view to help explain calculation (1) of concentration of the directional sign information.

In step SP8, the display route creation apparatus 1 uses the deformation section 9 to determine whether at least one of the line segments XXm, YYm, ZZm, AAm, . . . , constituting the merged route MRT as shown in FIG. 9 has a length greater than a predetermined value.

The following description will be made assuming that the line segment between node points NPX1 and NPX2 is XXm, line segment between node points NPY1 (NPX2) and NPZ2 is YYm, line segment between node points NPZ1 (NPY2) and NPZ2 is ZZm, and line segment between node points NPA (NPZ2) and NPA2 is AAm.

Although there exist other line segments than the line segments XXm, YYm, ZZm, and AAm, they are omitted for the sake of simplification.

When a negative result is obtained in step SP8, which means that each of the line segments XXm, YYm, ZZm, AAm, . . . , constituting the merged route MRT does not have a length greater than a predetermined value which is a condition for the line segment to be subjected to deformation (shortening), and the display route creation apparatus 1 advances to step SP12 without applying the deformation (shortening) to all the line segments constituting the merged route MRT.

On the other hand, when a positive result is obtained in step SP8, which means that any or all of the line segments XXm, YYm, ZZm, AAm, . . . , constituting the merged route MRT have a length greater than a predetermined value which is a condition for the line segment to be subjected to deformation (shortening), and the display route creation apparatus 1 advances to step SP9.

In this case, the deformation section 9 of the display route creation apparatus 1 makes determination of whether the deformation (shortening) is applied or not with respect to each of the line segments XXm, YYm, ZZm, AAm, . . . , constituting the merged route MRT.

Concretely, with regard to the line segment XXm, the deformation section 9 of the display route creation apparatus 1 determines whether the length of the line segment XXm is equal to or more than, e.g., double the average length of all the other line segments than the line segment XXm and, if so, acquires a positive result.

Similarly, with regard to the line segment YYm, the deformation section 9 of the display route creation apparatus 1 determines whether the length of the line segment YYm is equal to or more than, e.g., double the average length of all the other line segments than the line segment YYm and, if so, acquires a positive result.

Similarly, with regard to the line segment ZZm, the deformation section 9 of the display route creation apparatus 1 determines whether the length of the line segment ZZm is equal to or more than, e.g., double the average length of all the other line segments than the line segment ZZm and, if so, acquires a positive result.

Similarly, with regard to the line segment AAm, the deformation section 9 of the display route creation apparatus 1 determines whether the length of the line segment AAm is equal to or more than, e.g., double the average length of all the other line segments than the line segment AAm and, if so, acquires a positive result.

In this case, the display route creation apparatus 1 excludes the line segment ZZm from the deformation (shortening) target since the line segment ZZm does not satisfy the deformation (shortening) condition and sets only the line segments XXm, YYm, and AAm (each denoted by a dotted line) as a deformation (shortening) target.

In step SP9, the display route creation apparatus 1 uses the deformation section 9 to calculate concentration of the directional sign information DS with respect respectively to the deformation (shortening) target line segments XXm, YYm, and AAm of the merged route MRT and then advances to step SP10.

In this case, the deformation section 9 of the display route creation apparatus 1 counts the number DSn of the directional sign information DS existing inside a circle CIR having a radius corresponding to the average length of all the line segments constituting the merged route MRT for respective node points NP located on the both end points of the shortening target line segments XXm, YYm, and AAm and calculates the average value DSnA (hereinafter referred to as "directional sign information number average value") of the number DSn.

In the case of the line segment XXm, the number of the directional sign information DS existing inside a circle CIR1 centering on a node point NPX1 which is the left side end point of the line segment XXm is 0 and the number of the directional sign information DS existing inside a circle CIR2 centering on a node point NPX2 which is the right side end point of the line segment XXm is 0, so that the deformation section 9 calculates "0" as the directional sign information number average value DSnA of the line segment XXm.

In the case of the line segment YYm, the number of the directional sign information DS existing inside the circle CIR2 centering on a node point NPY1 (NPX2) which is the left side end point of the line segment YYm is 0 and the number of the directional sign information DS existing inside a circle CIR3 centering on a node point NPY2 which is the right side end point of the line segment YYm is 1 (see FIG. 5), so that the deformation section 9 calculates "0.5" as the directional sign information number average value DSnA of the line segment YYm.

In the case of the line segment AAm, the number of the directional sign information DSA existing inside a circle CIR4 centering on a node point NPA1 (NPA) which is the left side end point of the line segment AAm is 1 (see FIG. 5) and the number of the directional sign information DSB1 to DSB4 existing inside a circle CIR5 centering on a node point NPA2 which is the right side end point of the line segment AAm is 4 (see FIG. 5), so that the deformation section 9 calculates "2.5" as the directional sign information number average value DSnA of the line segment AAm.

That is, the deformation section 9 of the display route creation apparatus 1 calculates the directional sign information number average value DSnA for respective shortening target line segments XXm, YYm, and AAm as the concentration of the directional sign information DS with respect respectively to the line segments XXm, YYm, and AAm.

In this case, the deformation section 9 of the display route creation apparatus 1 determines that the concentration of the directional sign information DS is "low" with respect respectively to the line segments XXm and YYm whose directional sign information number average values DSnA are less than a predetermined threshold value "1" and sets the line segments XXm and YYm as a deformation (shortening) target.

On the other hand, the deformation section 9 of the display route creation apparatus 1 determines that the concentration of the directional sign information DS is "high" with respect to the line segment AAm whose directional sign information number average value DSnA is more than a predetermined threshold value "1" and excludes the line segment AAm from the deformation (shortening) target.

The deformation section 9 of the display route creation apparatus 1 determines the concentration of the directional sign information DS in a different perspective as well as makes a determination of the concentration by calculating the concentration of the directional sign information DS with respect respectively to the line segments XXm, YYm, and AAm using the above method. That is, as shown in FIG. 10A, the deformation section 9 divides the entire area of the map including the merged route MRT into four areas AR1 to AR4 each having a size of about 2.6 km×about 2.0 km and determines the concentration of the directional sign information DS based on the total number DSnT of the directional sign information DS existing in respective areas AR1 to AR4.

Concretely, the deformation section 9 counts the total number DSnT1 to DSnT4 of the directional sign information DS existing in respective areas AR1 to AR4. The deformation section 9 is configured to count directional sign information DS existing independently of the line segments constituting the merged route MRT as long as it exists within the areas AR1 to AR4.

Figures 10A, 10B:
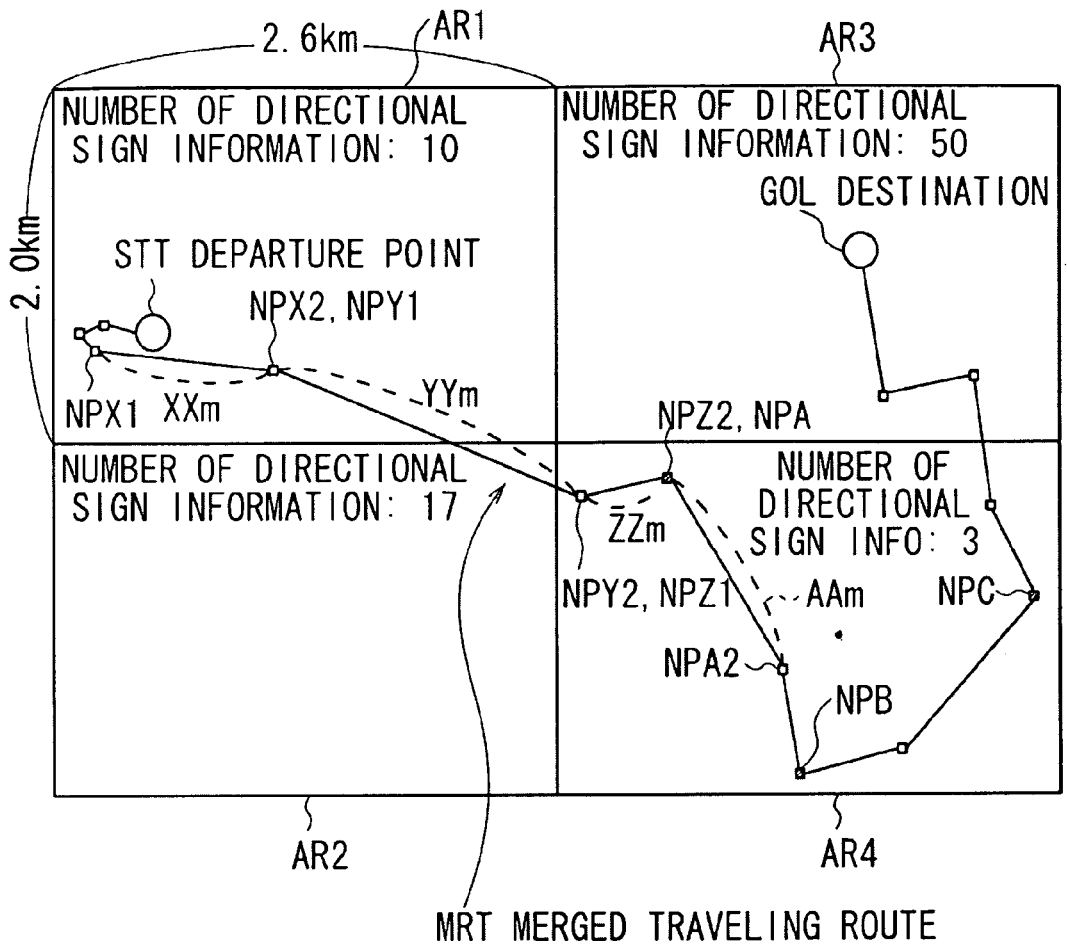
FIGS. 10A and 10B are schematic views to help explain calculation (2) of concentration of the directional sign information.

For example, for the total number DSnT1 to DSnT4 of the directional sign information DS in respective areas AR1 to AR4, as shown in FIG. 10B, the deformation section 9 determines that the concentration is "high" when the total number DSnT1 to DSnT4 is equal to or more than 30, determines that the concentration is "middle" when the total number DSnT1 to DSnT4 is equal to or more than 15, and determines that the concentration is "low" when the total number DSnT1 to DSnT4 is equal to or less than 14.

In step SP10, the display route creation apparatus 1 uses the deformation section 9 to determine that the concentration of the directional sign information DS is "low" with respect respectively to the line segments XXm and YYm whose directional sign information number average values DSnA are less than a predetermined threshold value "1" and deforms the line segments XXm and YYm by shortening their lengths irrespective of the actual scale of the map to thereby generate, as a final form, a deformed root DRT to be displayed on the display section 11, transmits the deformed root DRT to the map drawing section 10, and then advances to step SP11.

On the other hand, the display route creation apparatus 1 determines that the concentration of a line segment that is included in the areas AR1 and AR3 whose total number DSnT1 to DSnT4 of the directional sign information DS is equal to or less than 14 is "low" and deforms the line segment whose concentration is determined to be "low" by shortening the length thereof.

That is, the display route creation apparatus 1 selects a shortening target line segment (in this case, line segments XXm, YYm, and AAm) having a length greater than a predetermined value from among the line segments XXm, YYm, ZZm, AAm, . . . , constituting the merged route MRT in step SP8 and, after that, narrows down the shortening target by determining the concentration of the directional sign information DS with respect respectively to the line segments XXm, YYm, and AAm or with respect respectively to areas AR1 to AR4 in step S9 to thereby finally select the line segments XXm, YYm, and AAm for each of which the concentration of the directional sign information DS is determined to be "low" as the shortening target.

Figure 11:
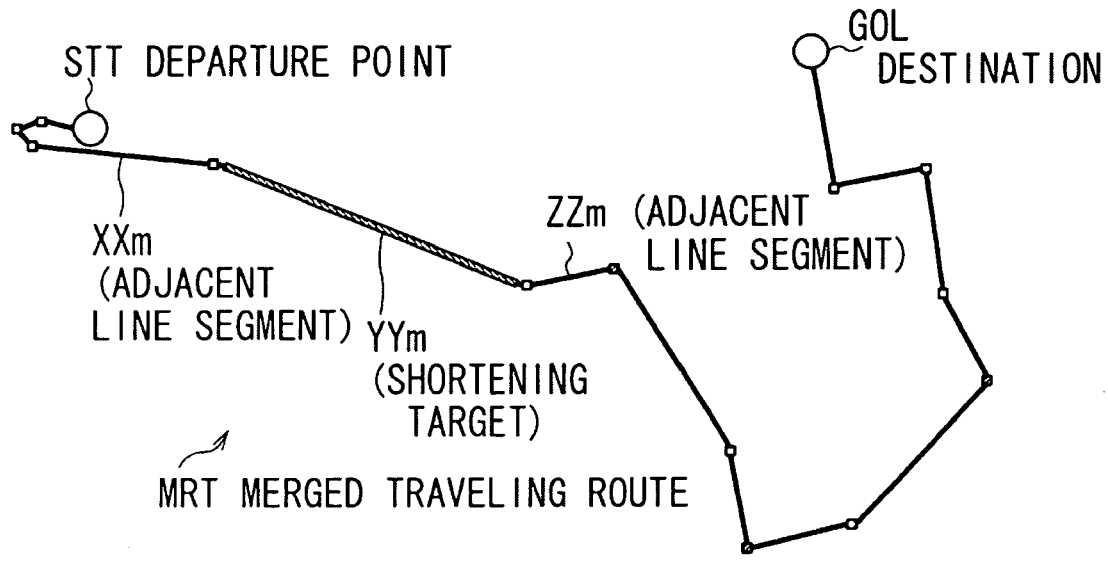
FIG. 11 is a schematic view showing an example of shortening line segment.
Figure 11:
Figure 11:
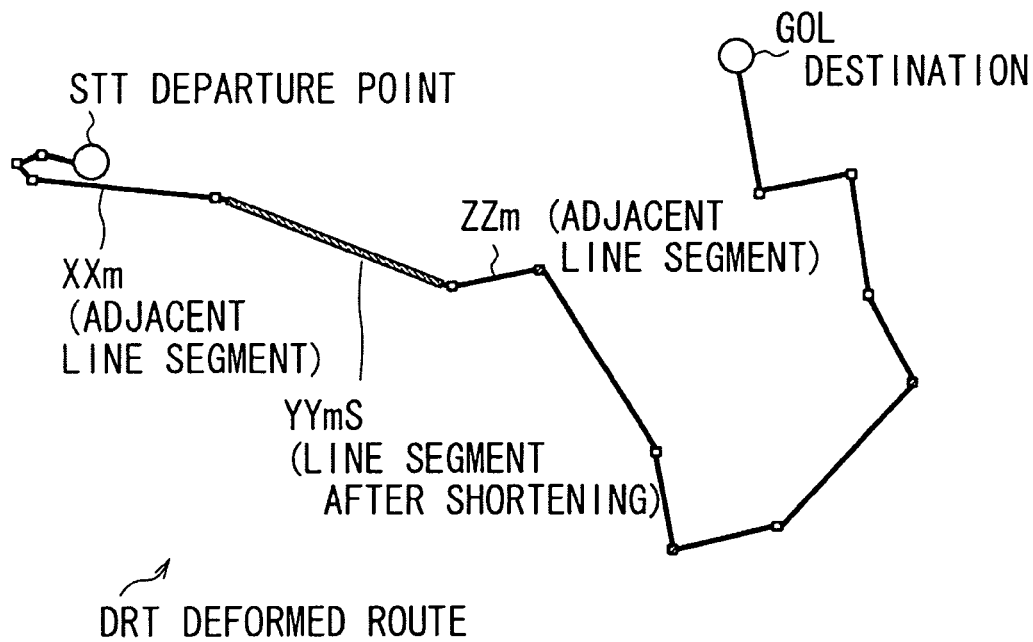

When shortening the length of, e.g., the shortening target line segment YYm irrespective of the actual scale of the map, the deformation section 9 of the display route creation apparatus 1 shortens the length thereof without changing the magnitude relation between the line segment YYm and its connecting line segments XXm and ZZm in the merged route MRT, as shown in FIG. 11.

Concretely, the deformation section 9 of the display route creation apparatus 1 calculates the maximum length of the line segment YYm in the range that does not change the magnitude relation that the shortening target line segment YYm is longer than the line segments XXm and ZZm and shortens the length of the line segment YYm to the calculated maximum length.

Concretely, the shortening target line segment YYm in the merged route MRT has a length about double that of its adjacent line segment XXm and has a length about triple that of its adjacent line segment ZZm, so that the deformation section 9 shortens the length of the line segment YYm at such a magnification (e.g., 0.7) that the line segment YYm is at least longer than the line segment XXm. In this case, it is possible to maintain the magnitude relation that the line segment YYmS after shortening in the deformed route DRT after shortening is longer than its adjacent line segments XXm and ZZm.

In the merged route MRT and deformed route DRT of FIG. 11, the vector display portion (represented by some arrows) of the directional sign display information DSAG, DSB5G, and DSC5G are omitted for the sake of simplification.

Figure 12:
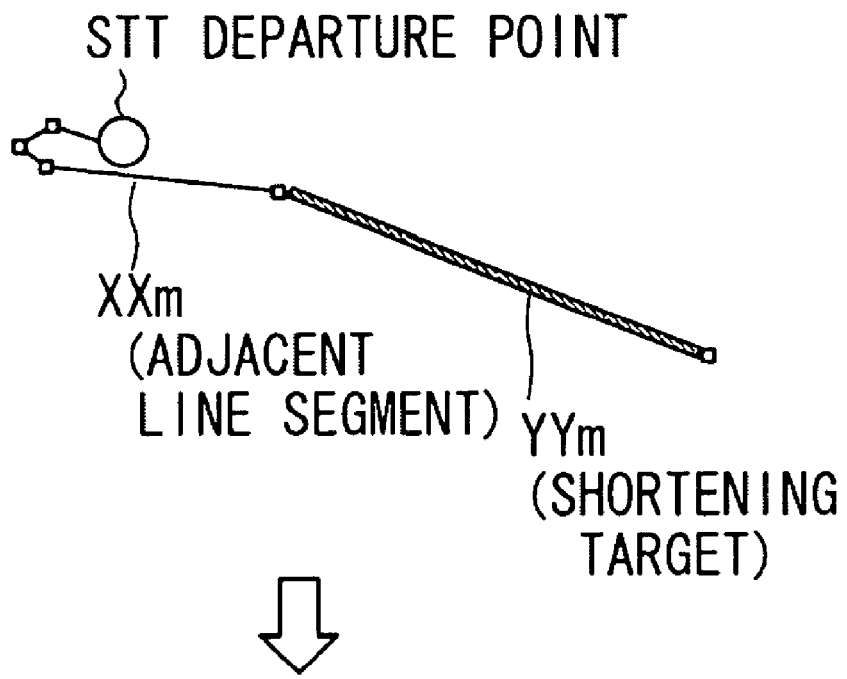
FIG. 12 is a schematic view to help explain migration of line segment.
Figure 12:
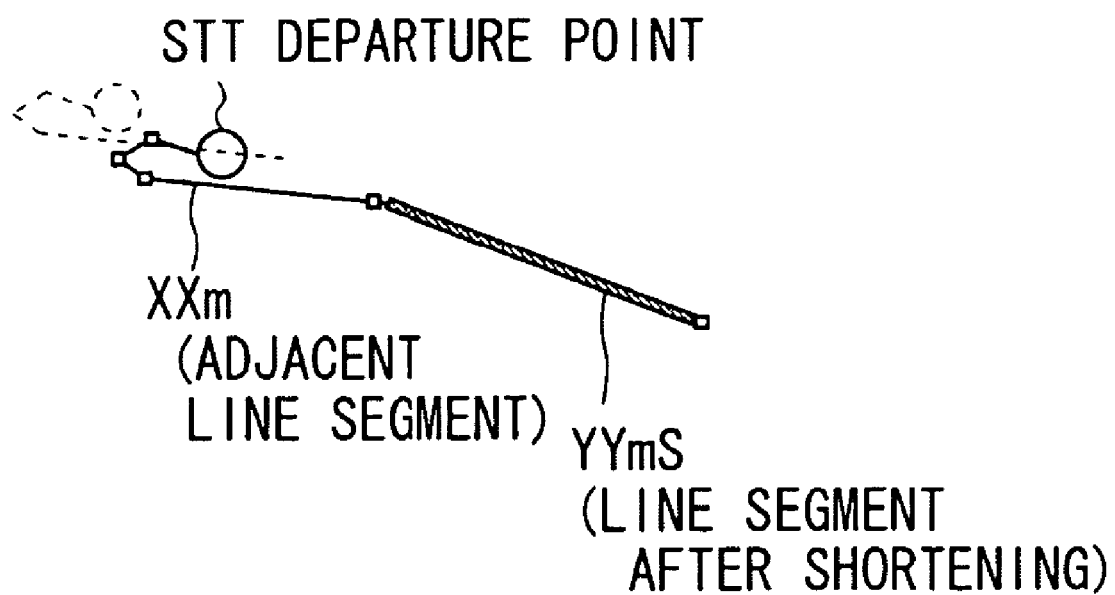

After shortening the length of the line segment YYm to obtain the line segment YYmS after shortening, the deformation section 9 of the display route creation apparatus 1 moves the adjacent line segment XXm (from the position denoted by a dotted line to the position denoted by a solid line) to connect it to the line segment YYmS after shortening as shown in FIG. 12 to thereby generate the deformed route DRT to be displayed on the display section 11.

Figure 13A:
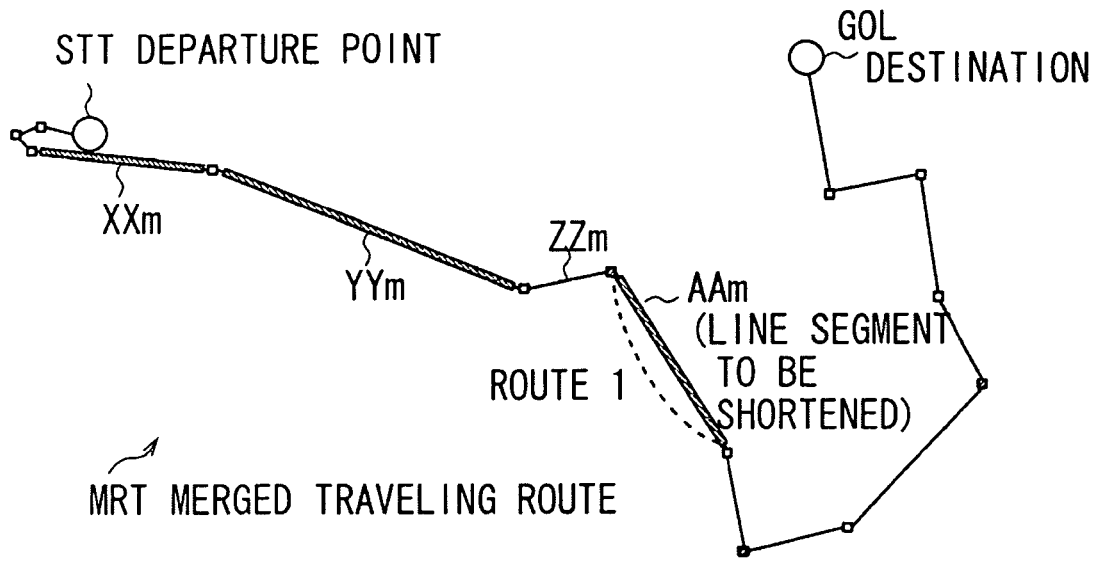
FIGS. 13A and 13B are schematic views to help explain shortening of line segment-following-the-road.

In step SP11, in the case where, e.g., the line segment AAm constituting the merged route MRT has a single road number or single road name as shown in FIG. 13A, the display route creation apparatus 1 uses the deformation section 9 to determine that the line segment AAm is a line segment following the road in which a road having a single number or single name continues (hereinafter, referred to as "line segment-following-the-road") and sets the line segment AAm as the deformation (shortening) target. After that, as descried above, the deformation section 9 shortens the length of, e.g., the line segment AAm without changing the magnitude relation between the line segment AAm and its adjacent line segments. ZZm and the like to thereby generate the deformed route DRT, transmits the deformed route DRT to the map drawing section 10, and then advances to step SP12.

Figure 13B:
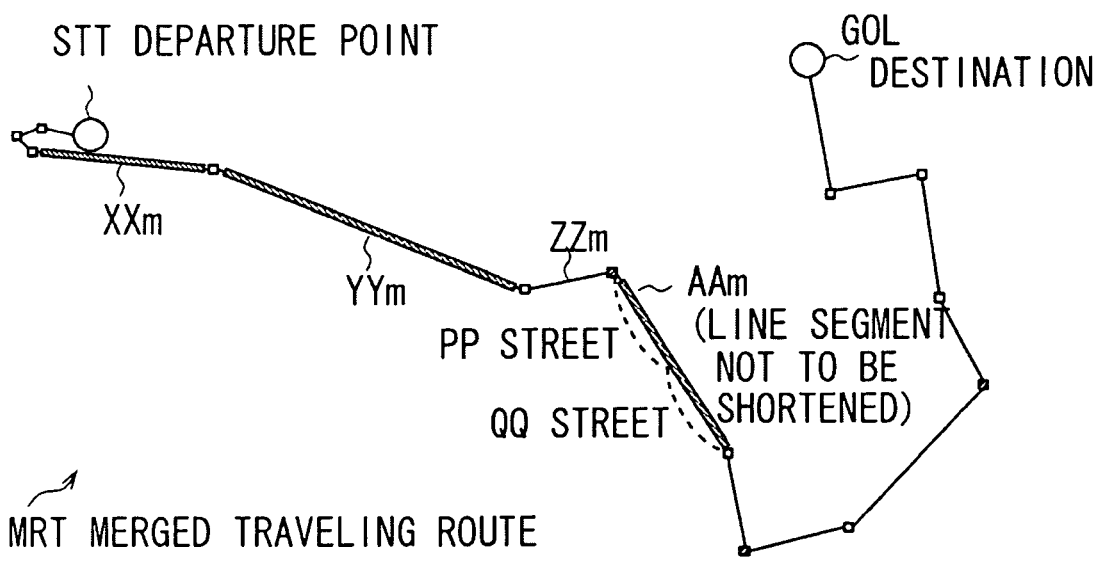

On the other hand, in the case where e.g., the line segment AAm constituting the merged route MRT includes a plurality of different road names as shown in FIG. 13B, the display route creation apparatus 1 uses the deformation section 9 to determine the line segment AAm is not line segment-following-the-road. In this case, the display route creation apparatus 1 advances to step SP 12 without setting the line segment AAm as the deformation (shortening) target.

Figure 14:
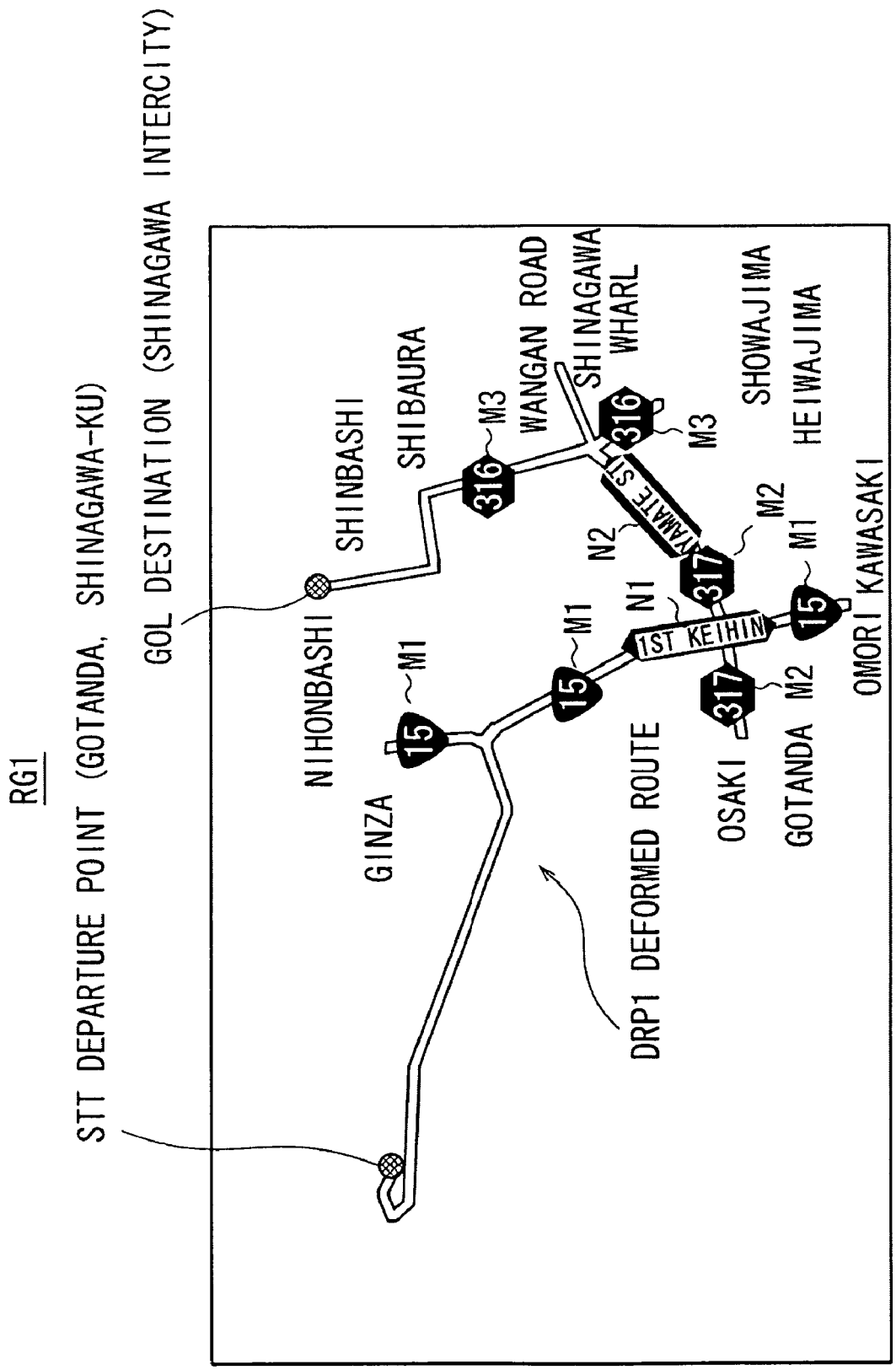
FIG. 14 is a schematic view to help explain a display route drawing result.

In step SP12, the display route creation apparatus 1 uses the map drawing section 10 to add, with respect to the merged route MRT or deformed route DRT, texts (e.g., "Ginza", "Nihonbashi", "Osaki", "Gotanda", etc.) indicating the directions on the map which are included on the display image portion to each end of the arrows of road indication, as well as add texts (e.g., "1st-keihin", "Yamate-Dori", etc.) indicating the names for identifying respective roads to the line segments, to thereby generate a route map screen RG1 including the merged route MRT or deformed route DRT as shown in FIG. 14, draws the route map screen RG1 on the display section 11, and then advances to step SP13 to complete this procedure.

On the route map screen RG1, the merged route NRT or deformed route DRT obtained by merging the display image portion of the directional sign information DS in the simplified traveling route RTN from the departure point STT to destination GOL is displayed and, at the same time, road number marks M1 to M3 or road name marks N1 and N2 are added to the route, and direction texts (e.g., "Ginza", "Nihonbashi", "Osaki", "Shinagawa", etc.) indicating the locations to which respective roads are directed are added to respective intersections.

Further, on the route map screen RG1, surrounding map images are not displayed but only the merged route MRT or deformed route DRT is displayed. That is, the display route creation apparatus 1 allows a user to visually confirm only the road number marks M1 to M3, road name marks N1 and N2, and direction texts, thereby allowing the user to intuitively understand the path to the destination GOL.

(2) Operation and Effect

With the above configuration, the display route creation apparatus 1 embeds, in the intersections on the simplified traveling route RTN obtained by simplifying the traveling route RT from the departure point STT to destination GOL, the display image portion of the directional sign information DS existing at the intersections for merging, to thereby generate the merged route MRT having a new display mode.

Further, the display route creation apparatus 1 selects a shortening target line segment (in this embodiment, line segments XXm, YYm, and AAm) having a length greater than a predetermined value from among the line segments XXm, YYm, ZZm, AAm, . . . , constituting the merged route MRT and, after that, narrows down the shortening target by determining the concentration of the directional sign information DS with respect respectively to the line segments XXm, YYm, and AAm or with respect respectively to the areas AR1 to AR4 to thereby finally select, e.g., the line segment YYm for which the concentration of the directional sign information DS is determined to be "low" as the shortening target.

That is, in the display route creation apparatus 1, since the concentration at which the directional sign information DS exist at both end points of the line segment YYm for which the concentration of the directional sign information DS is determined to be "low" is low, the frequency at which a user encounters the intersection at which an actual directional sign is installed during driving is considered to be low. Accordingly, the user does not feel odd while driving even when the length of the line segment YYm is shortened.

Therefore, the display route creation apparatus 1 shortens the length of, e.g., the shortening target line segment YYm to the maximum length in the range that does not change the magnitude relation between the line segment YYm and its adjacent line segments XXm and ZZm to thereby generate the compact deformed route DRT without breaking the visual balance of the original merged route MRT.

Actually, a driver unconsciously confirms the magnitude relation between the road that he or she is currently driving on and its adjacent roads during driving or when viewing the deformed route DRT. At that time, the driver does not feel odd since the display route creation apparatus 1 shortens the length of the line segment YYm without changing the magnitude relation between the line segment YYm and its adjacent line segments XXm and ZZm.

A conventional navigation apparatus only displays a traveling route from a departure point to destination, in which the entire traveling route gets lost in the map and any deformation for viewability has not been applied to the traveling route itself. Thus, it has been difficult for a user to intuitively understand the traveling route.

That is, the conventional navigation apparatus does not always display only minimum necessary information such as those related to main intersections, and it appears to be a reality that the more real the traveling route is, the more difficult for a user to understand the traveling route.

On the other hand, the display route creation apparatus 1 according to the embodiment of the present invention displays the route map screen RG1 including the deformed route DRT as described above on the display section 11 to allow a user to visually confirm only the road number marks M1 to M3, road name marks N1 and N2, and texts indicating directions at each intersection, thereby allowing the user to intuitively recognize the path from the departure point STT to destination GOL with far less information than that in the conventional navigation apparatus.

Therefore, the display route creation apparatus 1 can easily guide the user from the departure point STT to destination GOL while allowing the user (driver) to visually compare the display content of the deformed route DRT on the route map screen RG1 formed by simple and minimum necessary information and directional signs installed on the actual road.

In particular, to be able to easily guide the user from the departure point STT to destination GOL only with the simple route map screen RG1 is very useful for women who are not used to reading a map or aged persons who are difficult to read a small map due to poor eyesight.

With the above configuration, the display route creation apparatus 1 uses the root map screen RG1 to display, on the display section 11, the deformed route DRT of a simple display mode which is generated by using the display content of actual directional signs that a user obtains during driving, to allow the user to intuitively understand his or her traveling direction from the departure point STT to destination GOL, thereby easily guiding the user to the destination GOL.

(3) Other Embodiments

Figure 15:
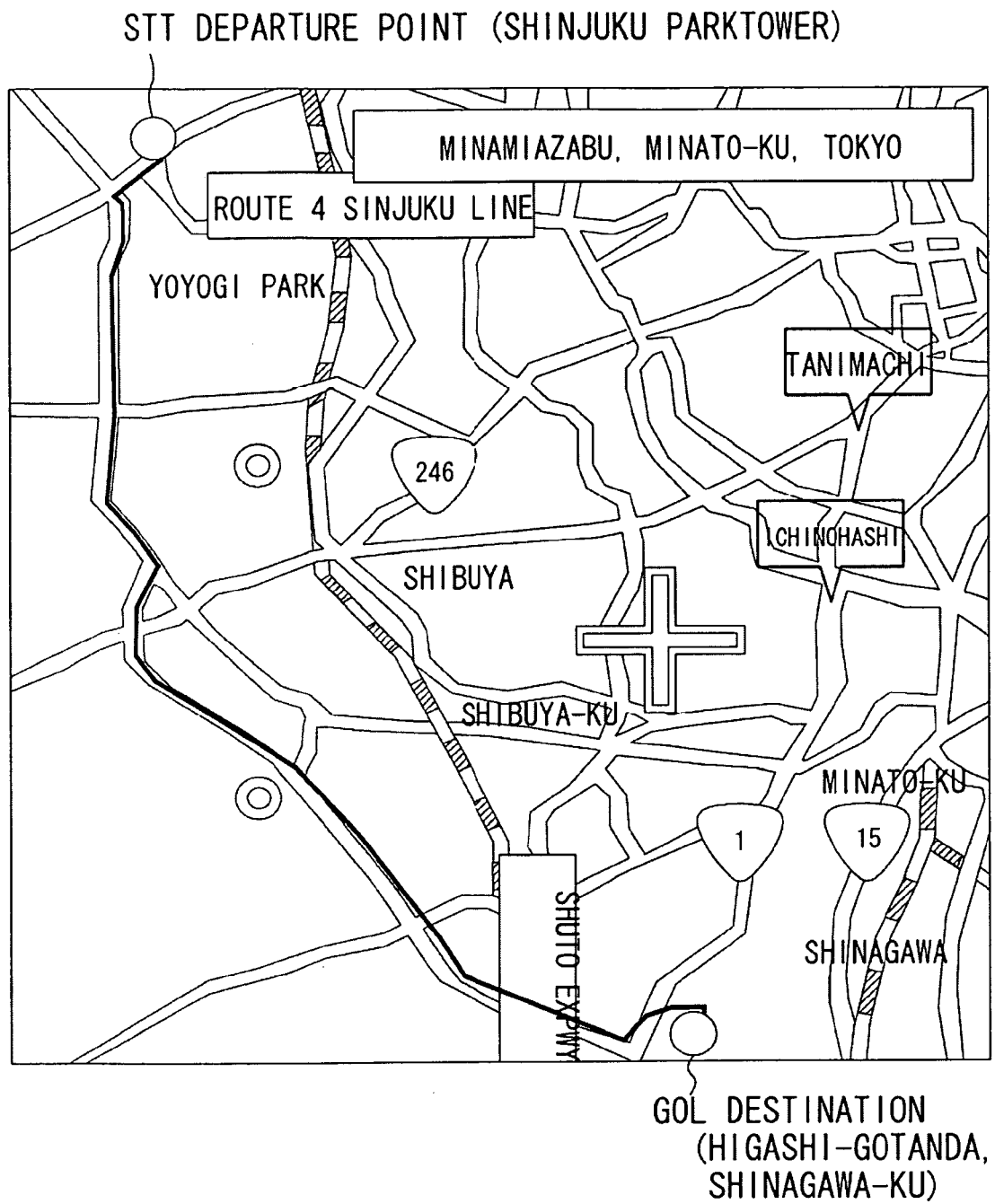
FIG. 15 is a schematic view showing an input example (1) of route information (departure point, destination) in another embodiment.

In the above embodiment, the deformed route DRT generated by setting "Higashi-gotanda, Shinagawa-ku" as the departure point and "Shinagawa Intercity" as the destination is displayed on the display section 11 by using the root map screen RG1. Alternatively, however, as shown in FIG. 15, a deformed route DRT generated by setting "Shinjuku Parktower" as the departure point and setting "Higashi-gotanda, Shinagawa-ku" as the destination may be displayed on the display section 11 by using the root map screen.

Figure 16:
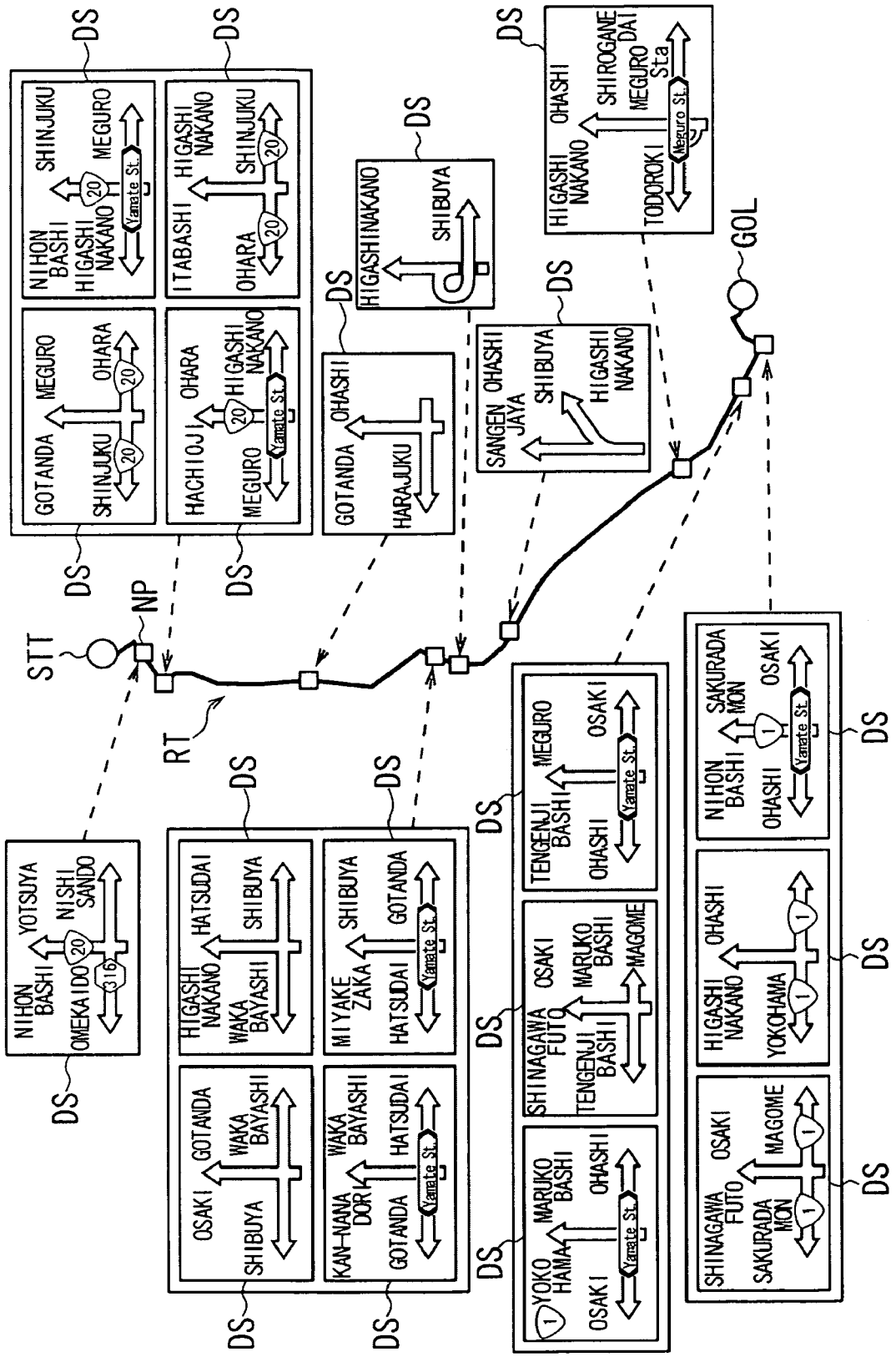
FIG. 16 is a schematic view showing an extraction example (1) of directional sign information on a traveling route in another embodiment.

In this case, as shown in FIG. 16, the display route creation apparatus 1 extracts plurality of directional sign information DS existing on the raveling route searched based on the departure point STT and destination GOL and, in the case where plurality of directional sign information DS exist with respect to one node point NP, merges their directional sign display information to thereby create one directional sign display information.

Figure 17:
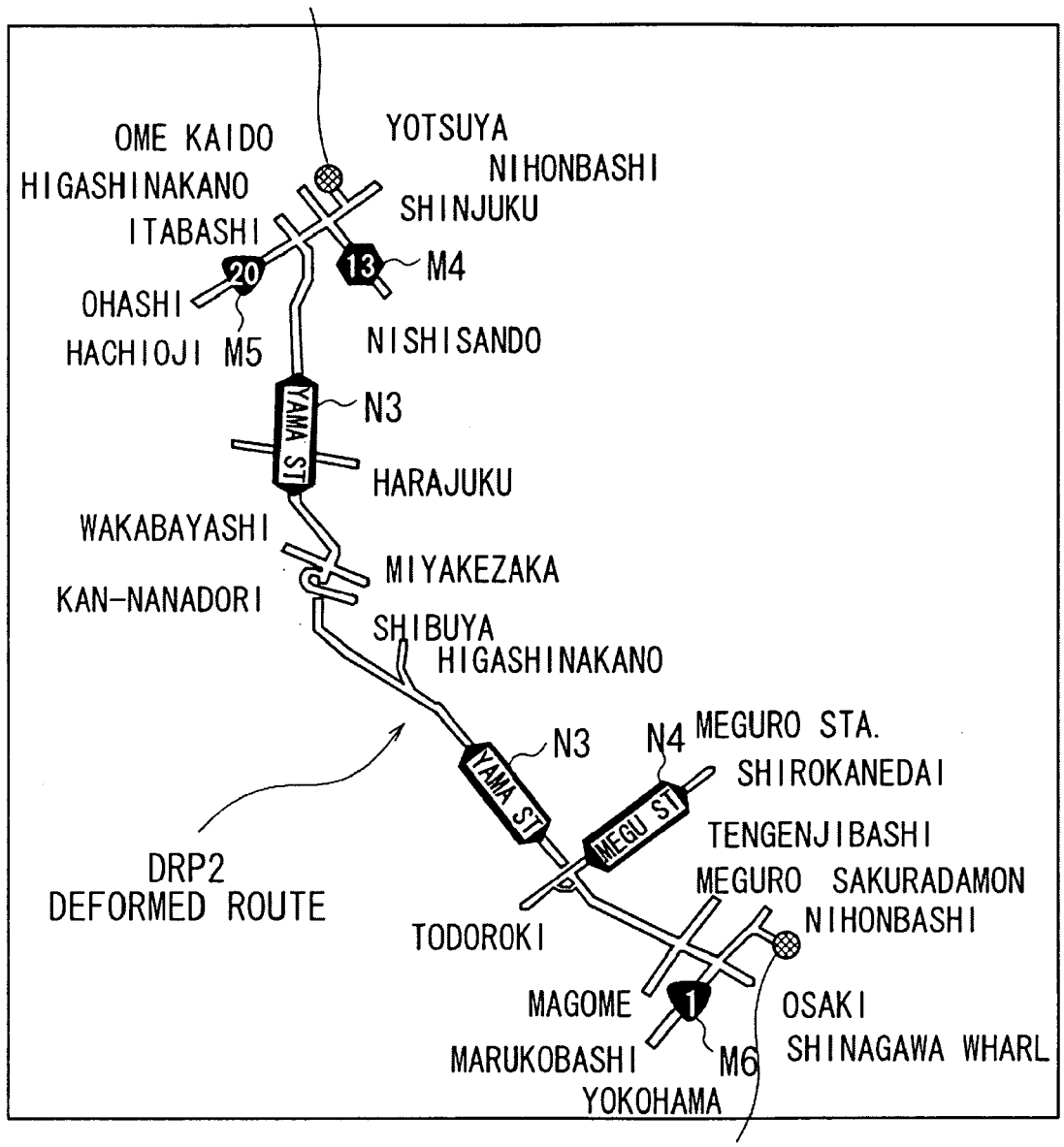
FIG. 17 is a schematic view showing a display route drawing result (1) in another embodiment.

Then, the display route creation apparatus 1 embeds the directional sign display information in each node point NP on the traveling route RT in an overlapping manner such that the vector display portion (represented by some arrows) of the directional sign display information follows the traveling route RT and that the directions of the arrows of the vector display portion coincide with respective separate paths and shortens a shortening target line segment in the manner as described above, to thereby generate a deformed route DRT2. After that, as shown in FIG. 17, the display route creation apparatus 1 displays a route map screen RG2 including the deformed route DRT2 on the display section 11.

Therefore, the display route creation apparatus 1 allows a user to visually confirm, through the deformed route DRT2 on the route map screen RG2, only road number marks M4 to M6, road name marks N3 and N4, and texts indicating directions at each intersection, thereby allowing the user to intuitively understand the path from the departure point STT to destination GOL with far less information than that in the conventional navigation apparatus.

Figure 18:
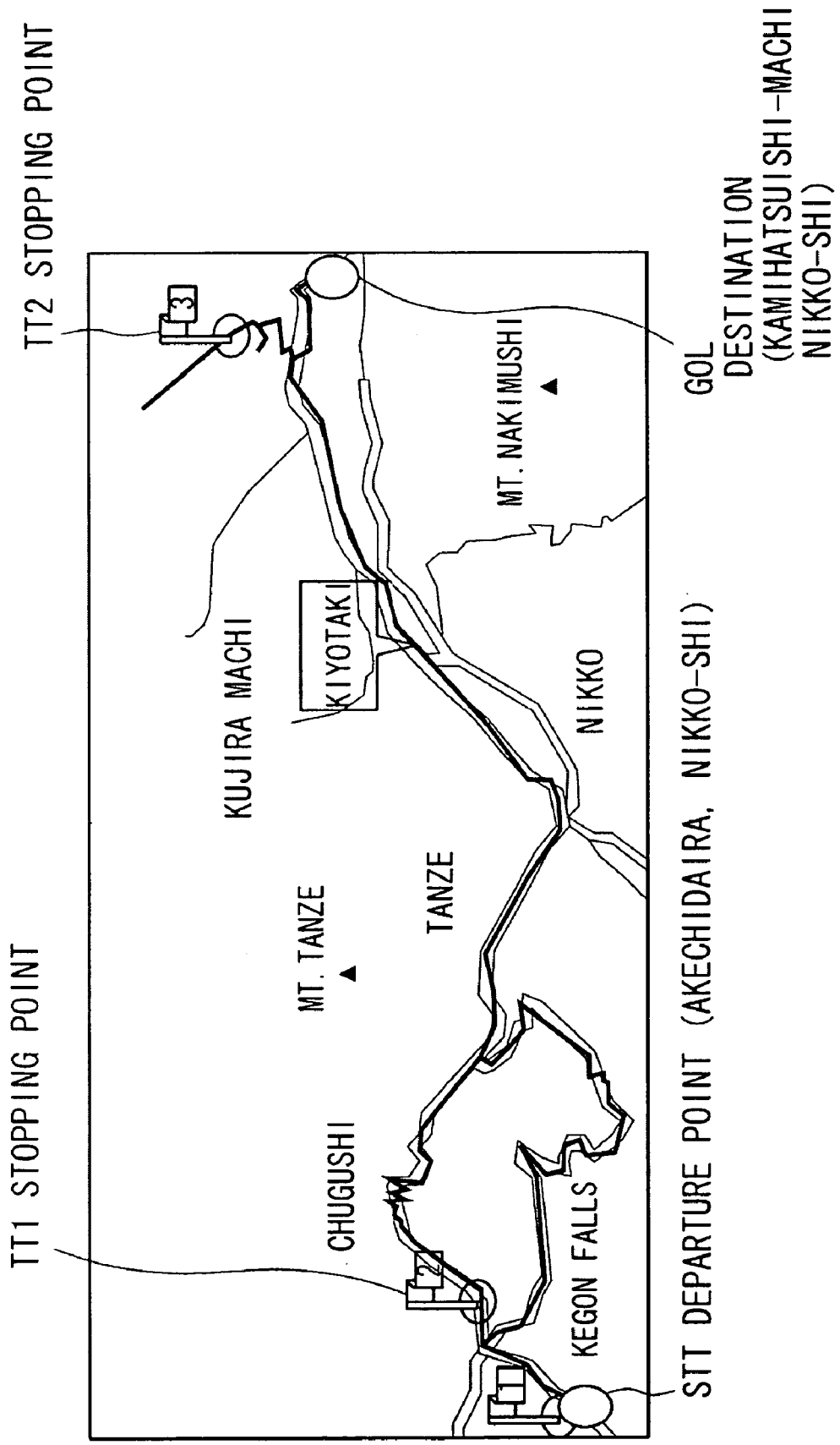
FIG. 18 is a schematic view showing an input example (2) of route information (departure point, destination) in another embodiment.

In the above embodiment, the deformed route DRT generated by setting "Higashi-gotanda, Shinagawa-ku" as the departure point STT and "Shinagawa Intercity" as the destination is displayed on the display section 11 by using the root map screen RG1. Alternatively, however, as shown in FIG. 18, a deformed route DRT generated by setting "Akechidaira, Nikko-shi" as the departure point STT, setting "Kamihatsu-ishi-machi, Nikko-shi" as the destination GOL, and setting stopping points TT1 and TT2 may be displayed on the display section 11 by using the root map screen.

Figure 19:
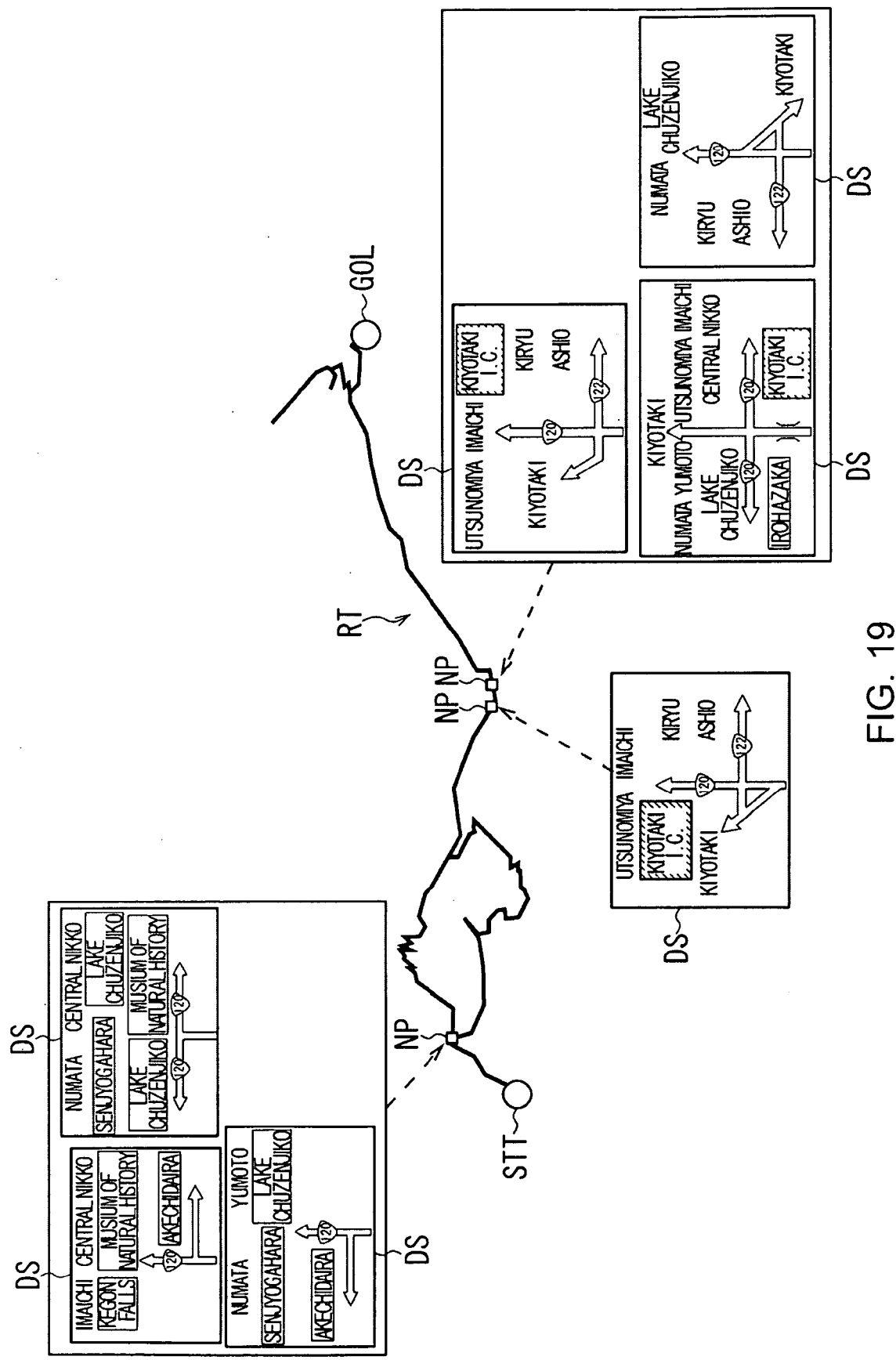
FIG. 19 is a schematic view showing an extraction example (2) of directional sign information on a traveling route in another embodiment.

In this case, as shown in FIG. 19, the display route creation apparatus 1 extracts plurality of directional sign information DS existing on the traveling route RT searched based on the departure point STT and destination GOL and, in the case where plurality of directional sign information DS exist with respect to one node point NP, merges their directional sign display information to thereby create one directional sign display information.

Figure 20:
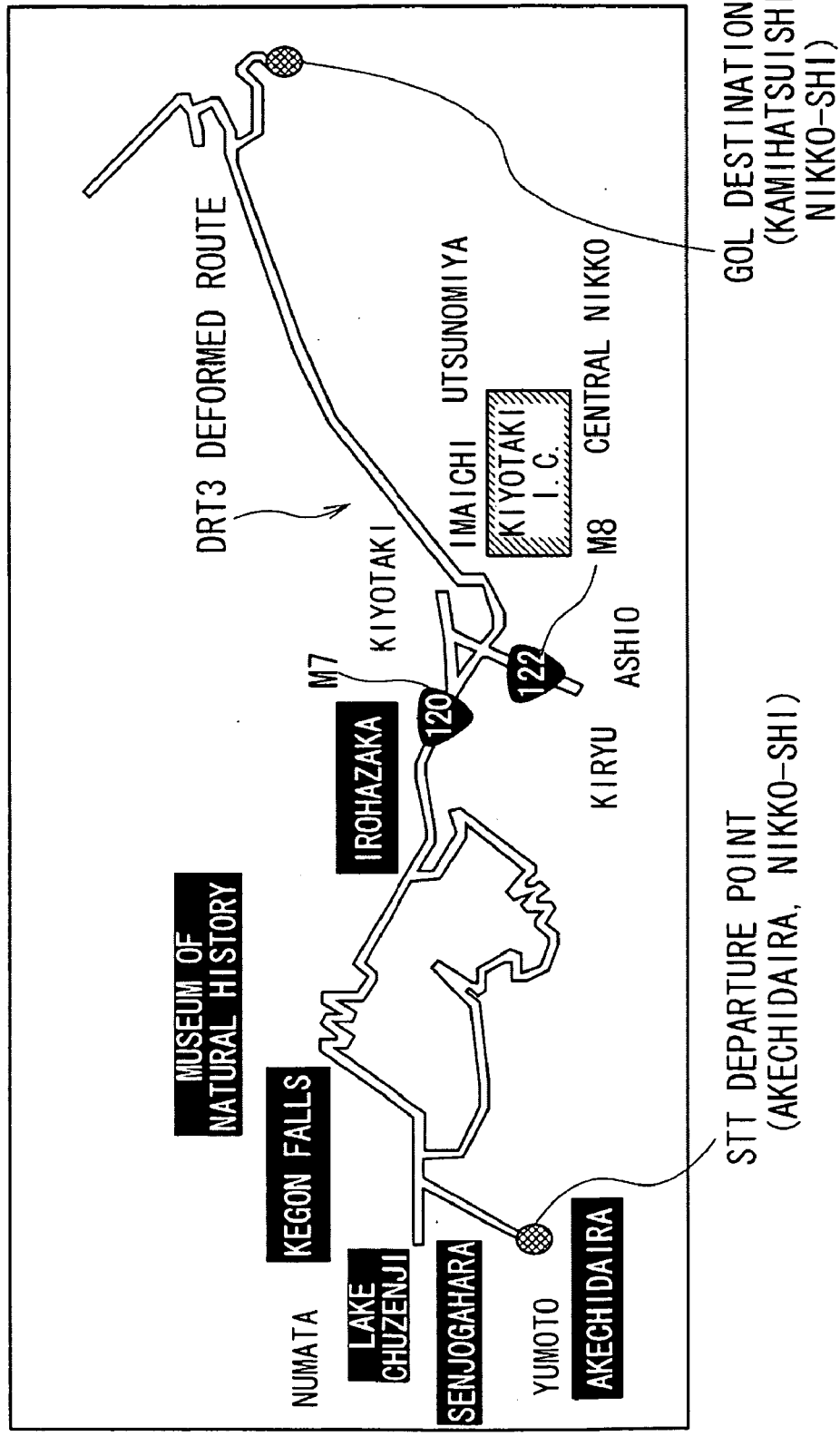
FIG. 20 is a schematic view showing a display route drawing result (2) in another embodiment.

Then, the display route creation apparatus 1 embeds the directional sign display information in each node point NP on the traveling route RT in an overlapping manner such that the vector display portion (represented by some arrows) of the directional sign display information follows the traveling route RT and that the directions of the arrows of the vector display portion coincide with respective separate paths and shortens a shortening target line segment in the manner as described above, to thereby generate a deformed route DRT3. After that, as shown in FIG. 20, the display route creation apparatus 1 displays a route map screen RG3 including the deformed route DRT3 on the display section 11.

Therefore, the display route creation apparatus 1 allows a user to visually confirm, through the deformed route DRT3 on the route map screen RG3, road number marks M7 and M8, texts indicating directions at each intersection, other text displays including building names, place names, and the like, thereby allowing the user to intuitively understand the path from the departure point STT to destination GOL with far less information than that in the conventional navigation apparatus.

Figure 21:
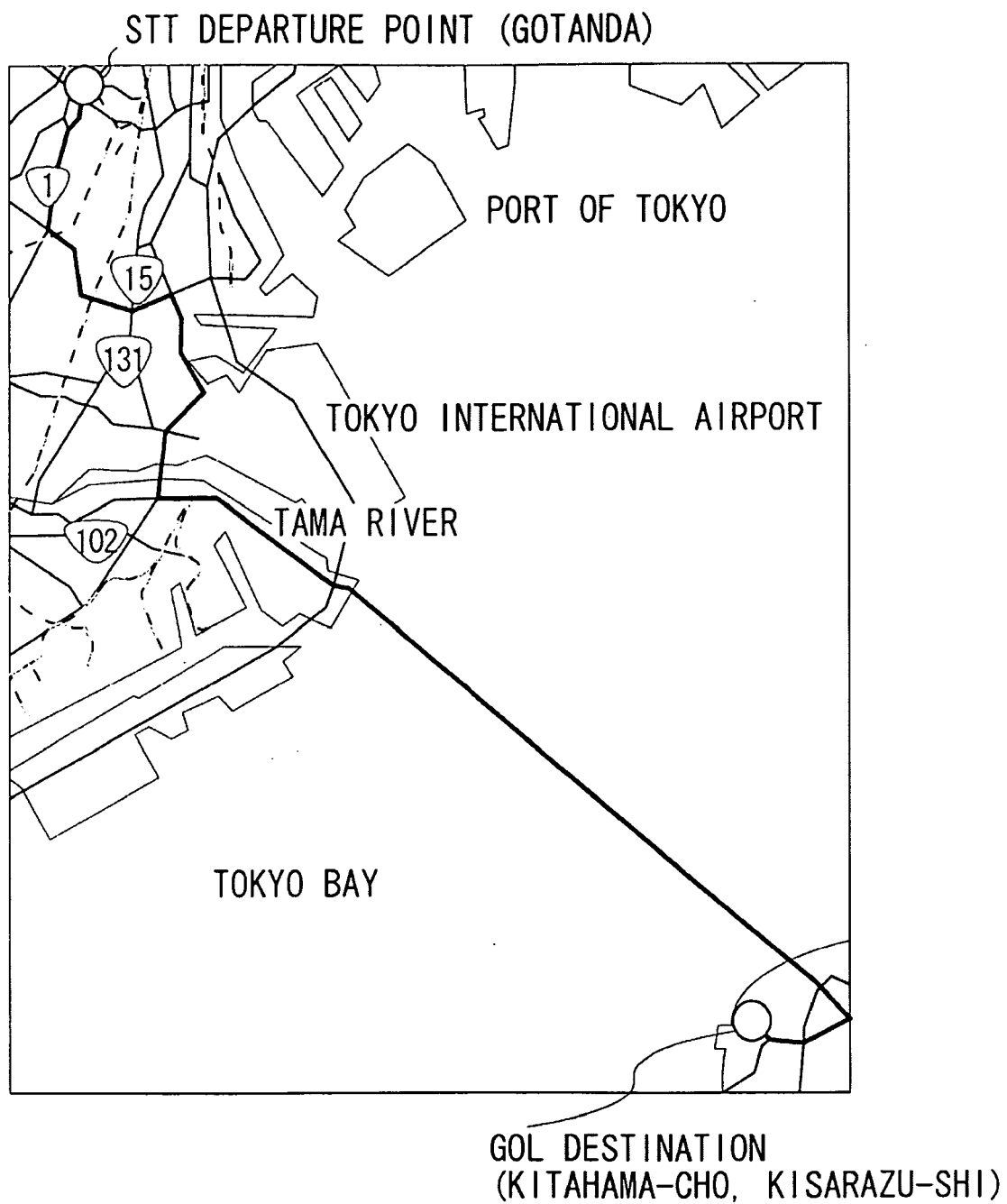
FIG. 21 is a schematic view showing an input example (3) of route information (departure point, destination) in another embodiment.

In the above embodiment, the deformed route DRT generated by setting "Higashi-gotanda, Shinagawa-ku" as the departure point and "Shinagawa Intercity" as the destination is displayed on the display section 11 by using the root map screen RG1. Alternatively, however, as shown in FIG. 21, a deformed route DRT generated by setting "Gotanda" as the departure point STT, and setting "Kitahama-cho, kisarazu-shi" as the destination GOL may be displayed on the display section 11 by using the root map screen.

Figure 22:
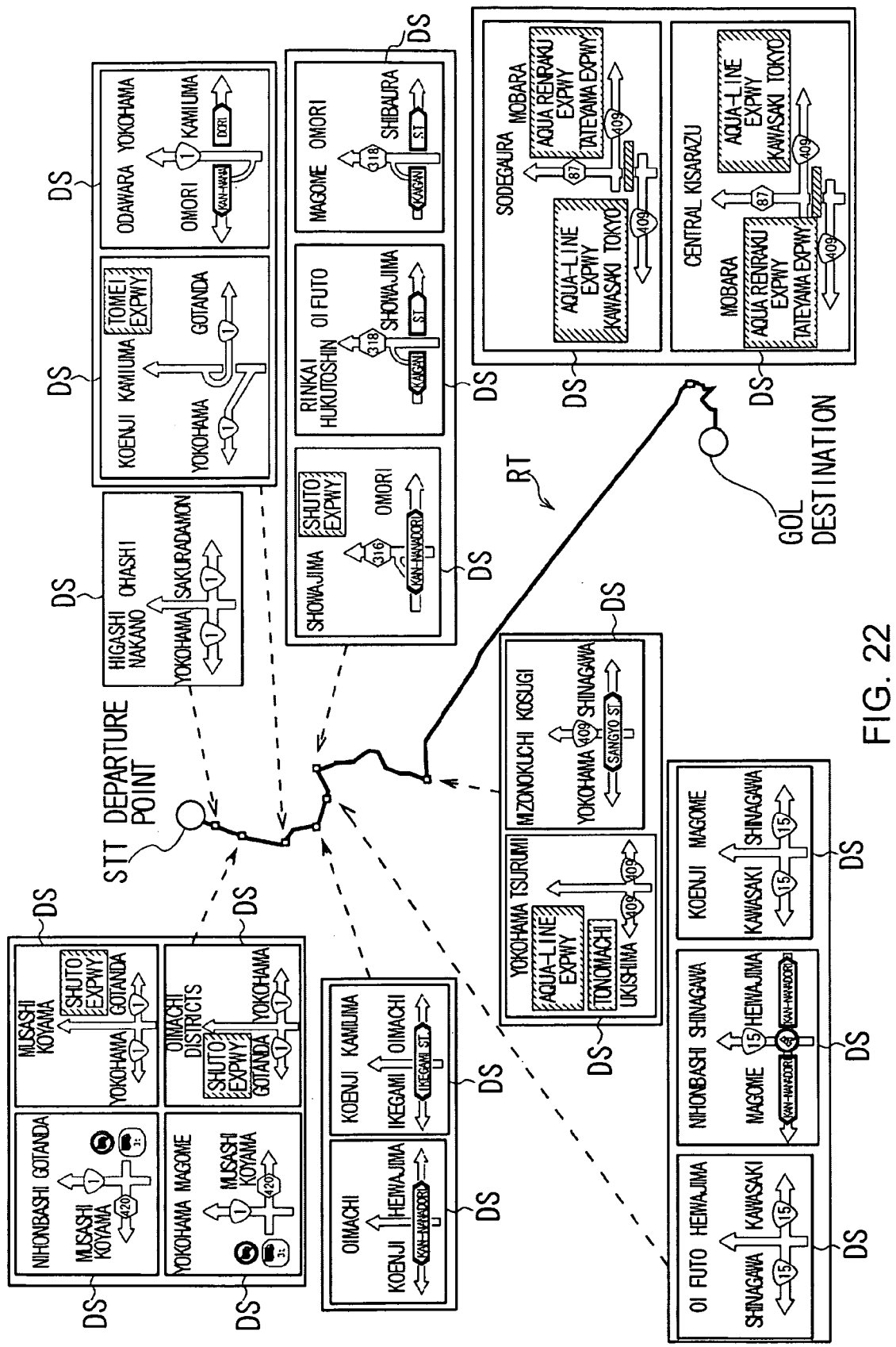
FIG. 22 is a schematic view showing an extraction example (3) of directional sign information on a traveling route in another embodiment.

In this case, as shown in FIG. 22, the display route creation apparatus 1 extracts plurality of directional sign information DS existing on the traveling route RT searched based on the departure point STT and destination GOL and, in the case where plurality of directional sign information DS exist with respect to one node point NP, merges their directional sign display information to thereby create one directional sign display information.

Figure 23:
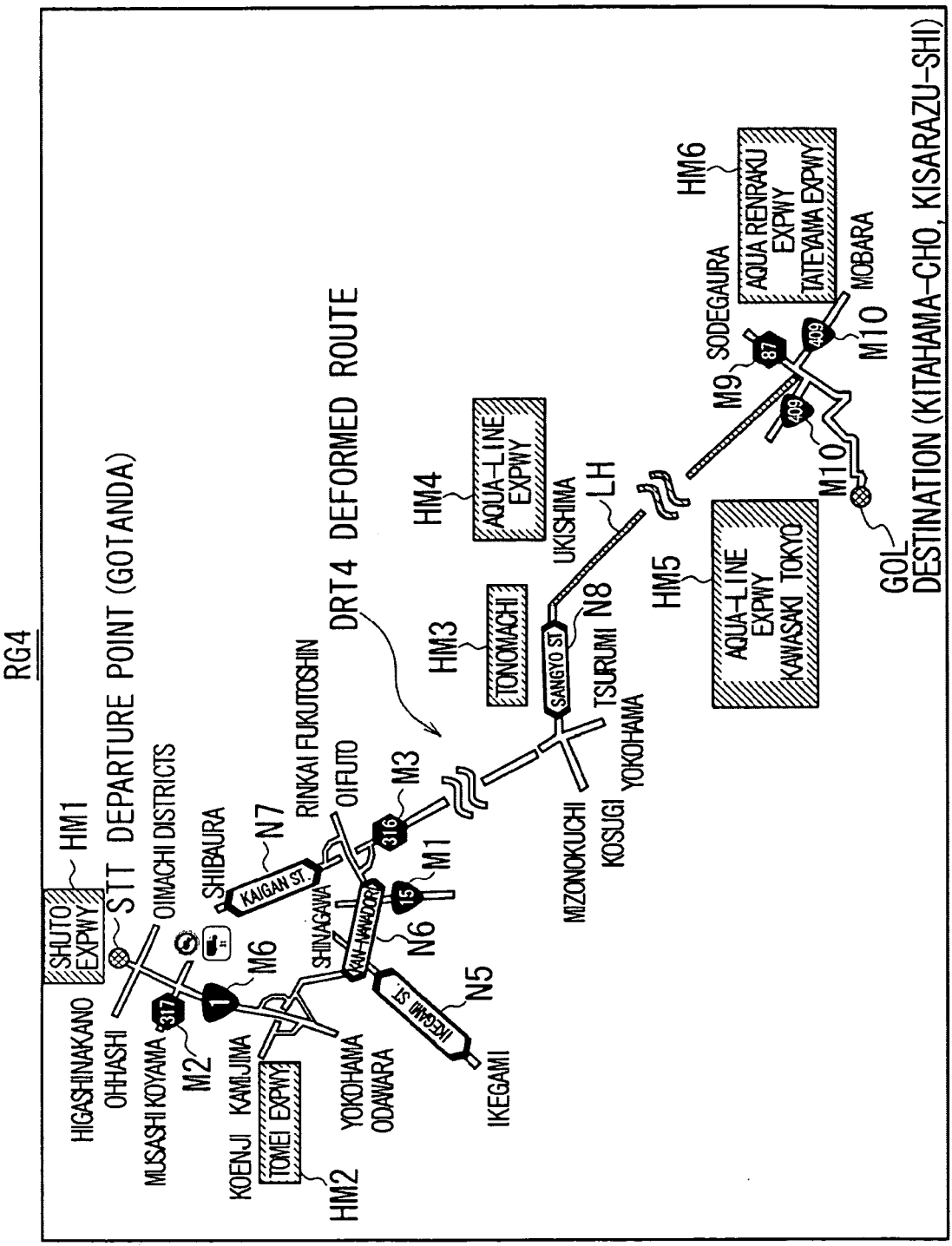
FIG. 23 is a schematic view showing a display route drawing result (3) in another embodiment.

Then, the display route creation apparatus 1 embeds the directional sign display information in each node point NP on the traveling route RT in an overlapping manner such that the vector display portion (represented by some arrows) of the directional sign display information follows the traveling route RT and that the directions of the arrows of the vector display portion coincide with respective separate paths and shortens a shortening target line segment in the manner as described above, to thereby generate a deformed route DRT4. After that, as shown in FIG. 23, the display route creation apparatus 1 displays a route map screen RG4 including the deformed route DRT4 on the display section 11.

Therefore, the display route creation apparatus 1 allows a user to visually confirm, through the deformed route DRT4 on the route map screen RG4, road number marks M1 to M3, M6, and M9, road name marks N5 to N8, texts indicating directions at each intersection, highway marks HM1 to HM6 having a different color (denoted by shaded area) from other marks, a highway line segment LH having a different color (denoted by shaded area) from other line segments, and the like, thereby allowing the user to intuitively understand the path from the departure point STT to destination GOL while the user intuitively distinguishes the general road and the highway by color with far less information than that in the conventional navigation apparatus.

In the above embodiment, the display route creation apparatus 1 sets, in step SP8 of the display route creation/drawing processing procedure RT1, any or all of the line segments XXm, YYm, ZZm, AAm, . . . , of the merged route MRT having a length greater than a predetermined value as the shortening target and calculates, in the subsequent step SP9, the concentration of the directional sign information DS. Alternatively, however, the display route creation apparatus 1 may only calculate the concentration of the directional sign information DS in step SP9 without making the determination of step SP8 so as to select the shortening target line segment.

In the above embodiment, the display route creation apparatus 1 calculates, in step SP9 of the display route creation/drawing processing procedure RT1, the concentration of the directional sign information DS with respect respectively to the line segments XXm, YYm, and AAm, shortens, in step SP10, the length of, e.g., the line segment YYm for which the concentration of the directional sign information DS is determined to be "low", and shortens, in step SP11, also the length of the line segment AAm which is the line segment-following-the-road. Alternatively, however, the display route creation apparatus 1 may apply shortening to one of the line segments YYm for which the concentration of the directional sign information DS is determined to be "low" and AAm which is the line segment-following-the-road.

In the above embodiment, the display route creation apparatus 1 counts in step SP9 of the display route creation/drawing processing procedure RT1, the number DSn of the directional sign information DS existing inside the circle CIR having a radius corresponding to the average length of all the line segments constituting the merged route MRT for respective node points NP located on the both end points of the line segments XXm, YYm, and AAm, calculates the directional sign information number average value DSnA of the number DSn, and determines that the concentration of the directional sign information DS with respect to the line segment whose directional sign information number average value DSnA is less than a predetermined threshold value "1" is "low". Alternatively, however, a configuration may be employed in which the display route creation apparatus 1 counts the number DSn of the directional sign information DS existing inside the circle CIR and determines that the concentration of the directional sign information DS with respect to the line segment for which the number DSn itself is less than a predetermined threshold is "low".

In the above embodiment, the display route creation apparatus 1 constructs, in a software manner, the route calculation section 2, route read section 3, directional sign information extraction section 4, directional sign display information read section 5, multi-directional sign merging section 6, route simplification section 7, route directional sign merging section 8, deformation section 9 and map drawing section 10 according to a predetermined application program previously installed to thereby execute the display route creation/drawing processing procedure (FIG. 2) of the routine RT1. Alternatively, however, the display route creation apparatus 1 may construct, in a software manner, the route calculation section 2, route read section 3, directional sign information extraction section 4, directional sign display information read section 5, multi-directional sign merging section 6, route simplification section 7, route directional sign merging section 8, deformation section 9 and map drawing section 10 according to an application program installed from a recording medium, an application program downloaded from the Internet, an application program installed through other various routes to thereby execute the display route creation/drawing processing procedure (FIG. 2) of the routine RT1.

In the above embodiment, the display route creation apparatus 1 constructs, in a software manner, the route calculation section 2, route read section 3, directional sign information extraction section 4, directional sign display information read section 5, multi-directional sign merging section 6, route simplification section 7, route directional sign merging section 8, deformation section 9 and map drawing section 10 according to a predetermined application program. Alternatively, however, the display route creation apparatus 1 constructs, in a hardware manner, the route calculation section 2, route read section 3, directional sign information extraction section 4, directional sign display information read section 5, multi-directional sign merging section 6, route simplification section 7, route directional sign merging section 8, deformation section 9 and map drawing section 10.

In the above embodiment, the display route creation apparatus 1 is constituted by the route calculation section 2 serving as a route determination section, directional sign information extraction section 4 serving as a directional sign image read section, and route directional sign merging section 8 serving as a merging section. Alternatively, however, the display route creation apparatus 1 may be constituted by the route determination section, directional sign image read section, and merging section including other various circuit configurations.

In the above embodiment, the display route creation apparatus 1 is constituted by the route calculation section 2 serving as a route determination section, directional sign information extraction section 4 serving as a directional sign image extraction section, and deformation section 9 serving as a directional sign information count section, a concentration determination section, and a line segment shortening section. Alternatively, however, the display route creation apparatus 1 may be constituted by the route determination section, directional sign image extraction section, directional sign information count section, concentration determination section, and line segment shortening section including other various circuit configurations.

The display route creation method, a display route creation apparatus, and a display route creation program according to the embodiment of the present invention is suitably applied to a case where an easy-to-read display route connecting a departure point and destination is created not only in, e.g., a car navigation apparatus but also other various electronic apparatuses such as a personal computer, a personal digital assistant (PDA), a mobile phone, and a game apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A computer-implemented method, comprising:
receiving information identifying a departure point and a destination point on a map;
determining a route between the departure and destination points, based on the received information, the route comprising at least one route segment having node points corresponding to intersections along the route segment;
obtaining, from a storage medium, directional sign information associated with the route;
generating, using a processor, a display route comprising a display image portion indicative of a road direction included in the directional sign information and the route;
determining, by the processor, a concentration of directional sign information physically located along the route segment, the determining comprising:
determining values indicative of directional sign information disposed within predetermined distances of corresponding ones of the node points; and
computing the concentration based on at least a subset of the values;
determining whether the concentration exceeds a threshold value;
modifying at least a portion of the display route corresponding to the route segment, when the concentration fails to exceed the threshold value; and
generating an instruction to transmit at least the modified display route to a device of the user.

2. The method of claim 1, wherein the modifying comprises deforming the at least one route segment by shortening its length irrespective of the actual scale of the map.

3. The method of claim 2, wherein:
the modifying further comprises computing, for the node points, angles defined by intersecting portions of the route segments; and
the deforming comprises maintaining at least one of the node points within the shorted route segment, when the at least one node point is associated with a non-zero value or the angle associated with the at least one node point is larger than a reference angle.

4. The method of claim 1, wherein the display route comprises text indicating a direction of at least one road.

5. The method of claim 1, wherein generating the display route comprises:
merging a plurality of directional sign information associated with a corresponding one of the node points to generate directional sign display information for the corresponding node point; and
incorporating the directional sign display information for the corresponding node point into the display route.

6. The method of claim 1, wherein display route comprises text indicating a name of at least one road.

7. An apparatus, comprising:
a receiving unit configured to receive information identifying a departure point and a destination point;
a route determination unit configured to determine a route between the departure and destination points, based on the received information, the route comprising at least one route segment having node points corresponding to intersections along the route segment;
a directional sign information extraction unit configured to obtain, from a storage medium, directional sign information associated with the route;
a generating unit configured to generate a display route comprising a display image portion indicative of a road direction included in the directional sign information and the route;
a determining unit, including a processor, configured to determine a concentration of directional sign information physically located along the route segment by:
determining values indicative of directional sign information disposed within predetermined distances of corresponding ones of the node points; and
computing the concentration based on at least a subset of the values;
a modifying unit configured to:
determine whether the concentration a exceeds a threshold value; and
modify at least a portion of the display route corresponding to the route segment, when the concentration fails to exceed the threshold value; and
a control unit configured to generate an instruction to transmit at least the modified displayed route to a device of the user.

8. A tangible, non-transitory computer-readable storage medium storing instructions that, when executed by at least one processor, cause the at least one processor to perform a method comprising the steps of:
receiving information identifying a departure point and a destination point;
determining a route a between the departure and destination points, based on the received information, the route comprising at least one route segment having node points corresponding to intersections along the route segment;
obtaining, from a storage medium, directional sign information associated with the route;
generating, using a processor, a display route comprising a display image portion indicative of a road direction included in the directional sign information and the route;
determining, by the processor, a concentration of directional sign information physically located along the route segment, the determining comprising:
determining values indicative of directional sign information disposed within predetermined distances of corresponding ones of the node points; and
computing the concentration based on at least a subset of the values;
determining whether the concentration exceeds a threshold value;
modifying at least a portion of the display route corresponding to the route segment, when the concentration fails to exceed the threshold value; and
generating an instruction to transmit at least the modified display route to a device of the user.

9. A computer-implemented method, comprising:
identifying an initial route between a departure point and a destination point on a map, the initial route comprising a plurality of route segments having corresponding node points, the node points corresponding to intersections along the route segments;
receiving directional sign information associated with the initial route;
calculating, using a processor, a concentration of directional sign information physically located along at least one of the route segments, the calculating comprising:
determining values indicative of directional sign information disposed within predetermined distances of corresponding ones of the node points of the at least one route segment; and
computing the concentration based on at least a subset of the values;
determining whether the concentration falls below a predetermined threshold value; and
shortening, using the processor, the at least one route segment to generate a simplified route, when the concentration falls below the predetermined threshold value.

10. The method of claim 9, wherein:
the plurality of node points comprises end points of the at least one route segment; and
determining the values comprises determining numbers of directional sign information within predetermined areas centered at the end points of the at least one route segment.

11. The method of claim 10, wherein determining the values further comprises determining an average of the numbers of directional sign information within the predetermined areas.

12. The method of claim 9, wherein:
the method further comprises determining whether a length of the at least one route segment is longer than the average length of the other route segments; and
the shortening comprises shortening the at least one route segment in accordance with a predetermined factor, when the concentration falls below the predetermined threshold value, and when the length of the selected route segment is longer than the average length.

13. The method of claim 12, wherein the shortening further comprises shortening the at least one route segment without changing a magnitude relation between the at least one route segment to be shortened and an adjacent route segment.

14. The method of claim 9, further comprising:
decomposing an area of the map including the route into a predetermined number of sub-areas;
computing a total number of values of directional sign information included in the area, based on numbers of directional sign information within the sub-areas; and
modifying the least one route segment, when the total number of directional sign information values falls below the predetermined threshold value.

15. The method of claim 12, wherein:
the method further comprises determining whether the at least one route segment is associated with a single route number or single route name; and
the shortening further comprises shortening the selected route segment in accordance with the predetermined factor, when the length of the selected route segment is longer than the average length, and when the at least one route segment is associated with a single route number or single route name.

16. The method of claim 15, wherein the shortening further comprises shortening the at least one route segment without changing a magnitude relation between the at least one route segment to be shortened and an adjacent route segment.

17. An apparatus, comprising:
a route determination unit configured to identify an initial route between a departure point and a destination point on a map, the initial route comprising a plurality of route segments having corresponding node points, the node points corresponding to intersections along the route segments;
a directional sign information extraction unit configured to read out directional sign information associated with the initial route;
a directional sign information count unit configured to calculate a concentration of directional sign information physically located along at least one of the route segments by:
determining values indicative of directional sign information disposed within predetermined distances of corresponding ones of the node points of the at least one route segment; and
computing, using a processor, the concentration based on at least a subset of the values;
a concentration determination unit configured to determine whether the concentration falls below a predetermined threshold value; and
a line segment shortening unit configured to shorten the at least one route segment to generate a simplified route, when the concentration falls below the predetermined threshold value.

18. A tangible, non-transitory computer-readable medium storing instructions that, when executed by at least one processor, cause the at least one processor to perform a method comprising:
identifying an initial route between a departure point and a destination point on a map, the initial route comprising a plurality of route segments having corresponding node points, the node points corresponding to intersections along the route segments;
receiving directional sign information associated with the initial route;
calculating a concentration of directional sign information physically located along at least one of the route segments, the calculating comprising:
determining values indicative of directional sign information disposed within predetermined distances of corresponding ones of the node points of the at least one route segment; and
computing the concentration based on at least a subset of the values;
determining whether the concentration falls below a predetermined threshold value; and
shortening the at least one route segment to generate a simplified route, when the concentration falls below the predetermined threshold value.

19. A computer-implemented method, comprising:
identifying, by a processor, an initial route between a departure point and destination point within a geographic region, the initial route comprising at least one route segment, and the route segment comprising one or more node points corresponding to intersections along the route segment;
receiving directional sign information associated with the initial route;
determining, by the processor, a concentration of directional sign information physically located along the route segment, the determining comprising:
determining values indicative of directional sign information disposed within predetermined distances of corresponding ones of the node points; and
computing the concentration based on at least a subset of the values;
determining, by the processor, whether the concentration exceeds a threshold value; and
modifying, by the processor, at least a portion of the initial route corresponding to the route segment, when the concentration fails to exceed the threshold value.

20. An apparatus, comprising:
a route determination section configured to identify an initial route based on a departure point and a destination set on a map, the initial route comprising at least one route segment, and the route segment comprising one or more node points corresponding to intersections along the route segment;
a directional sign information extraction section configured to receive, from a storage medium, directional sign information associated with the initial route;
a determining section configured to determine a concentration of directional sign information physically located along the route segment by:
determining values indicative of directional sign information disposed within predetermined distances of corresponding ones of the node points; and
computing, using a processor, the concentration based on at least a subset of the values; and
a modifying section configured to:
determine whether the concentration exceeds a threshold value; and
modify at least a portion of the initial route corresponding to the route segment, when the concentration fails to exceed the threshold value.

21. A tangible, non-transitory computer-readable storage medium storing instructions that, when executed by at least one processor, causes the at least one processor to perform a method comprising the steps of:
identifying an initial route between a departure point and destination point within a geographic region, the initial route comprising at least one route segment, and the route segment comprising one or more node points corresponding to intersections along the route segment;
receiving directional sign information associated with the initial route;
determining a concentration of directional sign information physically located along the route segment by:
determining values indicative of directional sign information disposed within predetermined distances of corresponding ones of the node points; and
computing the concentration based on at least a subset of the values;
determining whether the concentration exceeds a threshold value; and
modifying at least a portion of the initial route corresponding to the route segment, when the concentration fails to exceed the threshold value.

22. A method, comprising:
receiving route information identifying an initial route between a departure point and a destination point set on a map, and directional sign information associated with the route, the initial route comprising a plurality of route segments having corresponding node points, the node points corresponding to intersections along the route segments;
computing, by a processor, a concentration of directional sign information physically located along at least one of the route segments, the computing comprising:

determining values indicative of directional sign information disposed within predetermined distances of corresponding ones of the node points of the at least one route segment; and computing the concentration based on at least a subset of the values;

determining, by the processor, whether the concentration falls below a predetermined threshold value; and generating, using the processor, a simplified route between the departure and destination points based on the initial route, when the concentration falls below the predetermined threshold value.

23. An apparatus, comprising:

a receiving section configured to receive route information identifying an initial route between a departure point and a destination point set on a map, and directional sign information associated with the initial route, the route comprising a plurality of route segments having corresponding node points, the node points corresponding to intersections along the route segments;

a directional sign information count section configured to compute a concentration of directional sign information physically located along at least one of the route segments by:

determining values indicative of directional sign information disposed within predetermined distances of corresponding ones of the node points of the at least one route segment; and computing, using a processor, the concentration based on at least a subset of the values;

a concentration determination section configured to determine whether the concentration falls below a predetermined threshold value; and a line segment shortening section configured to generate a simplified route between the departure and destination points based on the initial route, when the concentration falls below the predetermined threshold value.

24. A tangible, non-transitory computer-readable storage medium storing instructions that, when executed by at least one processor, causes the at least one processor to perform a method comprising the steps of:

receiving route information identifying an initial route between a departure point and a destination point set on a map, and directional sign information associated with the initial route, the route comprising a plurality of route segments having corresponding node points, the node points corresponding to intersections along the route segments;

computing a concentration of directional sign information physically located along at least one of the route segments, the computing comprising:

determining values indicative of directional sign information disposed within predetermined distances of corresponding ones of the node points of the at least one route segment; and computing the concentration based on at least a subset of the values;

determining whether the concentration falls below a predetermined threshold value; and generating a simplified route between the departure and destination points based on the initial route, when the concentration falls below the predetermined threshold value.

* * * * *